US010127221B2

United States Patent
Zaric et al.

(10) Patent No.: US 10,127,221 B2
(45) Date of Patent: Nov. 13, 2018

(54) DETECTION AND RECONSTRUCTION OF EAST ASIAN LAYOUT FEATURES IN A FIXED FORMAT DOCUMENT

(71) Applicant: MICROSOFT TECHNOLOGY LICENSING, LLC, Redmond, WA (US)

(72) Inventors: Drazen Zaric, Belgrade (RS); Milan Sesum, Belgrade (RS); Milos Lazarevic, Belgrade (RS); Milos Raskovic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/144,400

(22) Filed: May 2, 2016

(65) Prior Publication Data

US 2016/0246774 A1    Aug. 25, 2016

Related U.S. Application Data

(63) Continuation of application No. 13/794,541, filed on Mar. 11, 2013, now Pat. No. 9,330,070.

(51) Int. Cl.
*G06F 17/20* (2006.01)
*G06F 17/27* (2006.01)
(Continued)

(52) U.S. Cl.
CPC .......... *G06F 17/275* (2013.01); *G06F 17/212* (2013.01); *G06F 17/214* (2013.01);
(Continued)

(58) Field of Classification Search
CPC .... G06F 17/275; G06F 17/214; G06F 17/212; G06F 17/2223; G06K 9/3208; G06K 9/00463
(Continued)

(56) References Cited

U.S. PATENT DOCUMENTS 5,212,769 A    5/1993  Pong
6,081,381 A    6/2000  Shalapenok et al.
(Continued)

FOREIGN PATENT DOCUMENTS

CN    1834992 A    9/2006
CN    101329731 A    12/2008
(Continued)

OTHER PUBLICATIONS

"First Office Action and Search Report Issued in Chinese Patent Application No. 201480026958.6", dated Apr. 26, 2017, 14 Pages.
(Continued)

*Primary Examiner* — Thierry L Pham
(74) *Attorney, Agent, or Firm* — Merchant & Gould P.C.

(57) ABSTRACT

Detection of East Asian layout features and reconstruction of East Asian layout features is provided. Vertically written text in the fixed format document is detected and rotated for layout analysis. After layout analysis, the rotated text is rotated back and restructured in a flow format document. When a plurality of characters is written horizontally in a vertical line of text, vertically overlapping text runs are detected, designated as horizontal-in-vertical text, and are restructured as horizontal-in-vertical text in a flow format document. Lines of text are analyzed for attributes of a ruby line and are designated as ruby text, associated with corresponding text in a ruby base line, and restructured as ruby text in a flow format document. Text in a fixed format document is analyzed for detection of a particular East Asian language so that a font for the language is designated in a flow format document.

20 Claims, 22 Drawing Sheets

(51) Int. Cl.
*G06F 17/22* (2006.01)
*G06K 9/00* (2006.01)
*G06F 17/21* (2006.01)
*G06K 9/32* (2006.01)

(52) U.S. Cl.
CPC ...... *G06F 17/2223* (2013.01); *G06F 17/2715* (2013.01); *G06K 9/00463* (2013.01); *G06K 9/3208* (2013.01)

(58) Field of Classification Search
USPC .................................................. 704/8, 260
See application file for complete search history.

(56) References Cited

U.S. PATENT DOCUMENTS

| | | | |
|---|---|---|---|
| 6,148,110 | A | 11/2000 | Yajima et al. |
| 6,370,269 | B1 | 4/2002 | Al-Karmi et al. |
| 6,525,749 | B1 | 2/2003 | Moran et al. |
| 6,915,484 | B1 | 7/2005 | Ayers et al. |
| 7,181,068 | B2 | 2/2007 | Suzuki et al. |
| 7,561,737 | B2 | 7/2009 | Zou et al. |
| 7,853,869 | B2 | 12/2010 | Gurcan et al. |
| 8,064,696 | B2 | 11/2011 | Radakovic et al. |
| 8,209,600 | B1 | 6/2012 | Koh et al. |
| 8,249,356 | B1 | 8/2012 | Smith |
| 8,271,873 | B2 | 9/2012 | El-Shishiny et al. |
| 8,280,892 | B2 | 10/2012 | Marvit et al. |
| 8,559,718 | B1 | 10/2013 | Chulinin |
| 8,942,489 | B2 | 1/2015 | Sesum et al. |
| 9,330,070 | B2 | 5/2016 | Zaric et al. |
| 9,460,089 | B1* | 10/2016 | Rathod ................ G06F 17/214 |
| 2002/0126905 | A1 | 9/2002 | Suzuki et al. |
| 2004/0093355 | A1 | 5/2004 | Stinger |
| 2004/0105583 | A1 | 6/2004 | Jacobs |
| 2004/0194028 | A1 | 9/2004 | O'Brien |
| 2005/0183033 | A1 | 8/2005 | Feinberg et al. |
| 2005/0251735 | A1 | 11/2005 | Dunietz et al. |
| 2006/0001667 | A1 | 1/2006 | LaViola et al. |
| 2006/0062469 | A1 | 3/2006 | Li et al. |
| 2006/0210195 | A1 | 9/2006 | Ohguro |
| 2007/0002054 | A1 | 1/2007 | Bronstein |
| 2007/0009161 | A1 | 1/2007 | Hollingsworth |
| 2007/0136660 | A1 | 6/2007 | Gurcan et al. |
| 2009/0304282 | A1 | 12/2009 | Predovic et al. |
| 2009/0304283 | A1 | 12/2009 | Predovic et al. |
| 2010/0174985 | A1 | 7/2010 | Levy et al. |
| 2011/0115796 | A1 | 5/2011 | Murrett et al. |
| 2011/0222771 | A1 | 9/2011 | Cimpoi et al. |
| 2011/0289395 | A1 | 11/2011 | Breuel et al. |
| 2012/0039536 | A1 | 2/2012 | Dejean et al. |
| 2012/0102393 | A1 | 4/2012 | Kutsumi et al. |
| 2012/0107779 | A1 | 5/2012 | Halton et al. |
| 2012/0185766 | A1 | 7/2012 | Mansfield et al. |
| 2012/0185788 | A1 | 7/2012 | Fong et al. |
| 2013/0067313 | A1 | 3/2013 | Leguin et al. |
| 2013/0124953 | A1 | 5/2013 | Fan et al. |
| 2013/0174017 | A1 | 7/2013 | Richardson et al. |
| 2013/0205200 | A1 | 8/2013 | Lazarevic et al. |
| 2014/0108897 | A1 | 4/2014 | Boutelle et al. |
| 2014/0258852 | A1 | 9/2014 | Sesum et al. |

FOREIGN PATENT DOCUMENTS

| | | |
|---|---|---|
| CN | 101593278 A | 12/2009 |
| CN | 101777124 A | 7/2010 |
| CN | 101796509 A | 8/2010 |
| CN | 102131161 A | 7/2011 |
| CN | 102375988 A | 3/2012 |
| CN | 102411707 A | 4/2012 |
| CN | 102782703 A | 11/2012 |
| EP | 1703444 A2 | 9/2006 |
| JP | 62-057069 A | 3/1987 |
| JP | 11-259477 A | 9/1999 |
| JP | 2002269499 A | 9/2002 |
| JP | 2003256679 A | 9/2003 |
| KR | 1020080053930 | 6/2008 |
| RU | 2421810 | 6/2011 |
| RU | 2421810 C2 | 6/2011 |
| TW | 200519637 A | 6/2005 |
| WO | 2009030577 A2 | 3/2009 |
| WO | 2013110285 A1 | 8/2013 |

OTHER PUBLICATIONS

"International Preliminary Report on Patentability Issued in PCT Application No. PCT/US2014/019646", dated Oct. 30, 2015, 9 Pages.

"International Search Report & Written Opinion for PCT Application No. PCT/US2014/019646", dated May 15, 2015, 14 Pages.

Etemad, Elika J., "Robust Vertical Text Layout", In Proceedings of 27th Internationalization and Unicode Conference, Berlin, Germany, Apr. 2005, 26 pages.

Ishii, Koji, "Unicode Properties for Horizontal and Vertical Text Layout", In Proceedings of Unicode Technical Report #50, Oct. 28, 2012, 24 pages.

Lemberg, Werner, "Unicode Support in the CJK Package", In Proceedings of The Asian Journal of TEX, vol. 2, No. 1, Apr. 2008, 10 pages.

Marshall, Gwyneth, "East Asian Text Layout Features in Office 2010", Published on: Mar. 24, 2010, Available at: http://blogs.technet.com/b/office_global_experience/archive/2010/03/25/east-asian-text-layout-features-in-office-2010.aspx.

Suignard, Michel, "CSS3 Text Extensions", In Proceedings of Eighteenth International Unicode Conference, Hong Kong, Apr. 27, 2001, 16 pages.

"Non-Final Office Action Issued in U.S. Appl. No. 13/794,541", dated May 28, 2015, 11 Pages.

"Notice of Allowance Issued in U.S. Appl. No. 13/794,541", dated Dec. 30, 2015, 9 Pages.

"Creative Suite Help / Arabic and Hebrew Support in CS6", http://helpx.adobe.com/mena/using/arabic-hebrew.html, Nov. 22, 2012, 17 pages.

"Unicode Character Property—Wikipedia", Old Revision of Wikipedia, https://en.wikipedia.org/w/index.php?title=unicode_character_propert&oldid=539206458, p. 20, Feb. 20, 2013, pp. 47.

"Welcome to TrueType Oven", http://www.microosft.com/typography/tt/tt_open/msdn/ttoch01.doc, Mar. 1995, 8 pages.

"Word Features for Right-to-Left Language", http://www.microsoft.com/typography/tt/tt_open/msdn/ttoch01.doc, Mar. 1995, 1 page.

Andries, "Introduction a Unicode et a IISO 10646", Document numerique, vol. 6, issue 3, http://cairn.info/revue-document-numreique-2002-3-page-51.htm, Mar. 2002, 48 pages.

Baoshiu et al., "Study of Mathematical Formula Searching and Matching Technique", Bazhong Keji vol. 5, May 10, 2011, pp. 58-29.

Chowdhury et al., "Automated Segmentation of Math-Zones from Document Images", Proceedings of the 7th International Conference on Document Analysis and Recognition, Piscataway, NJ, USA, IEEE, Aug. 3, 2003, pp. 755-759.

Davis, "Unicode Standard Annex #9—Unicode Bidirectional Algorithm", Internet Citation, http://unicode.org/reports/tr9, Sep. 27, 2010, 30 pages.

Eto, "Mathematical formula recognition using virtual link network", In proceedings of Sixth International Conference on Document Analysis and Recognition, Sep. 10, 2001, 6 pages.

Gidali, "Complex-Text Languages—An Overview", http://web.archive.org/web/20050905235220/http://www.opengroup.org/onlinepubs/9638399/overview.htm, Sep. 5, 2005, 26 pages.

Hssini et al., "Problem of multiple Diacritics Design for Arabic Script", IOSR Journal of Engineering, Dec. 31, 2012, pp. 48-53.

Jin et al., "Mathematical Formulas Extraction", Proceedings of the 7th International Conference on Document Analysis and Recognition, Piscataway, NJ, USA, IEEE, Mar 8, 2003, pp. 1138-1141.

Kacem et al., "Automatic Extraction of Printed Mathematical Formulas using Fuzzy Logic and Propagation of contextpsdoc", International Journal of Document Analysis and Recognition, IJDAR, Springer, Heidelberg, DE, vol. 4, Jan. 1, 2001, pp. 97-108.

(56) References Cited

OTHER PUBLICATIONS

Liang et al., "Document layout structure extraction using bounding boxes of different entitles", Third IEEE Workshop on applications on Computer Vision, Dec. 2, 1996, pp. 278-283.
Lin et al., "Identification of embedded mathematical formulas in PDF documents using SVM", publicly available on Google since Dec. 22, 2011, 11 pages.
Lin et al., "Mathematical Formula Identification in PDF Documents", 2011 International Conference on Document Analysis and Recognition, ICDAR 2011, Beijing, China, Sep. 18, 2011, 5 pages.
PCT International Search Report and Written Opinion in PCT/US2014/019646, dated May 15, 2015, 14 pages.
Poirier et al., "An Interactive system to extract structured text from a geometrical representation", Proceedings of the 4th International Conference on Document Analysis and Recognition, Aug. 18, 1997, pp. 342-346.
Suzuki et al., "Automatic translation of technological papers into braille by means of OCR", In the Institute of Image Information and Television Engineers, Technical Report, vol. 21, No. 48, pp. 7-14.
Taiwanese Notice of Allowance in Application 103107923, dated Jun. 21, 2017, 6 pages.
Taraborelli, "The Beauty of Latex", http://nitens.org/taraborelli/latex, Nov. 16, 2006, 11 pages.
Watanabe et al., "Recognizing mathematical expressions and fonts in inputting images into technological papers", The Institute of Television Engineers, Technical Report, vol. 18, No. 34, Jun. 23, 1994, pp. 13-18.
"Welcome to TrueType Open," Retrieved from the Internet: <URL: http://www.microsoft.com/typography/tt/tt_open/msdn/ttoch01.doc>, Mar. 1995, [archived on Wayback Machine Aug. 16, 2000], 10 pages.
"Word Features for Right-to-Left Language", http://office.microsoft.com/en-in/word-help/word-features-for-right-to-left-languages-HP005258567.aspx, downloaded Nov. 22, 2012 [large-print copy included], 3 pages.
Andries, "Introduction to Unicode and ISO 10646", vol. 6, Issue 3. Retrieved from the Internet: <http://cairn.info/revue-document-numreique-2002-3-page-51.htm> [machine translation] 2002, 63 pages.
Chinese Office Action in Application 201480026958.6 dated Dec. 11, 2017, 15 pages. [English translation].
Creative Suite Help / Arabic and Hebrew Support in CS6, http://helpx.adobe.com/mena/using/arabic-hebrew.html, last updated May 4, 2012, archived May 13, 2012, 11 pages.
Hao, Baoshui, [Study of Mathematical Formula Searching and Matching Technique] "shu xue gong shi jian suo yu pi pei ji shu yan jiu", Da Zhong Ke Ji, vol. 5, pp. 58-59, May 10, 2011. [English abstract].
Javed et al., "Improving Nastalique Specific Pre-Recognition Process for Urdu OCR", Dec. 14, 2009, 6 pages.
Suzuki et al., "Automatic Braille Transformation System Using the OCR for Scientific Documents", In the Institute of Image Information and Television Engineers, ITE Technical Report, vol. 21, No. 48, pp. 7-14, Sep. 18, 1997 [English abstract].
Taraborelli, "The Beauty of Latex", http://nitens.org/taraborelli/latex, [archived on the Wayback Machine Jul. 9, 2011], 8 pages.
Watanabe et al., "Recognizing mathematical expressions and fonts in inputting images into technological papers", The Institute of Television Engineers, Technical Report, vol. 18, No. 34, Jun. 23, 1994, pp. 13-18. [English abstract].

\* cited by examiner

PAGE 302

READING ORDER 306

花鳥風月。猿も木から落ちる。見ぬが花。

井の中の蛙大海を知らず。

二兎を追う者は一兎をも得ず。

継続は力なり。七転び八起き。

雨降って地固まる。猿も木から落ちる。

花鳥風月。井の中の蛙大海を知らず。

見ぬが花。二兎を追う者は一兎をも得ず。

HORIZONTAL TEXT 504

DOCUMENT BODY 314

FIG. 5A

| LANGUAGE | UNICODE VALUES | |
|---|---|---|
| | LANGUAGE SPECIFIC RANGES | SHARED RANGES |
| JAPANESE | 1202A — U+3040 – U+309F HIRAGANA<br>1202B — U+30A0 – U+30FF KATAKANA | 1204A — U+4E00 – U+9FCF CJK UNIFIED IDEOGRAPHS (KANJI)<br>1204B — U+F900 – U+FAFF CJK COMPATIBILITY IDEOGRAPHS<br>1204C — U+2F00 – U+2FDF CJK RADICALS/KANGXI RADICALS |
| KOREAN | 1202C — U+1100 – U+11FF HANGUL JAMO<br>1202D — U+AC00 – U+D7AF HANGUL SYLLABLES | |
| SIMPLIFIED CHINESE | | |
| TRADITIONAL CHINESE | | |

Mobile Computing Device

DETECTION AND RECONSTRUCTION OF EAST ASIAN LAYOUT FEATURES IN A FIXED FORMAT DOCUMENT

RELATED APPLICATIONS

This application is a continuation of U.S. patent application Ser. No. 13/794,541, filed Mar. 11, 2013, entitled "Detection and Reconstruction of East Asian Layout Features in a Fixed Format Document," and assigned U.S. Pat. No. 9,330,070, which is hereby incorporated by reference.

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document may be converted into a flow format document. Conversion involves parsing the fixed format document and transforming the basic physical layout elements from the fixed format document into the more complex logical elements used in a flow format document.

Some East Asian languages may be written horizontally or vertically. For example, Chinese, Japanese, and Korean scripts (sometimes referred to herein as CJK scripts) may be oriented in either a horizontal or a vertical direction. In some cases, vertically written text may include horizontal-in-vertical text, where multiple characters may be displayed horizontally in an area reserved for one vertical character. Currently, when converting a fixed format document with vertical text to a flow format document, vertically written text, including horizontal-in-vertical text, may not be recognized, and thus may not be reconstructed correctly.

Additionally, in both horizontally and vertically written East Asian scripts, a reading aid, herein referred to as ruby text, comprising characters indicating pronunciation of a word, may be included. In horizontal text, ruby text may be placed above a line of text, while in vertical text, ruby text may be placed to the right of a line of text. Currently, when converting a fixed format document to a flow format document, ruby text may be recognized as regular text flow and may not be reconstructed correctly and associated with a corresponding base text.

Further, various East Asian languages share a range of Unicode values whose graphical representations may depend on a particular font being used. Accordingly, when restructuring a document written in an East Asian language (e.g., Chinese, Japanese, or Korean), determination of a particular language may be performed to provide an appropriate font for the language.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing detection of vertical text in a fixed format document and restructuring of the vertical text when converting a fixed format document to a flow format document.

Embodiments of the present invention solve the above and other problems by providing detection of ruby text in a fixed format document and restructuring of the ruby text when converting a fixed format document to a flow format document.

Embodiments of the present invention solve the above and other problems by providing detection of horizontal-in-vertical text in a fixed format document and restructuring of the horizontal-in-vertical text when converting a fixed format document to a flow format document.

Embodiments of the present invention solve the above and other problems by providing detection of a particular East Asian language in a fixed format document and restructuring of the particular East Asian language when converting a fixed format document to a flow format document.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings:

FIG. 5A is an illustration of the page with vertical text in FIG. 3A rotated 90° counterclockwise;

FIG. 12 is an illustration of a table enumerating Unicode ranges for Japanese, Korean, and Chinese languages;

FIG. 13 is an illustration of a paragraph comprising characters specific to the Japanese language and shared characters;

DETAILED DESCRIPTION

Figure 1:
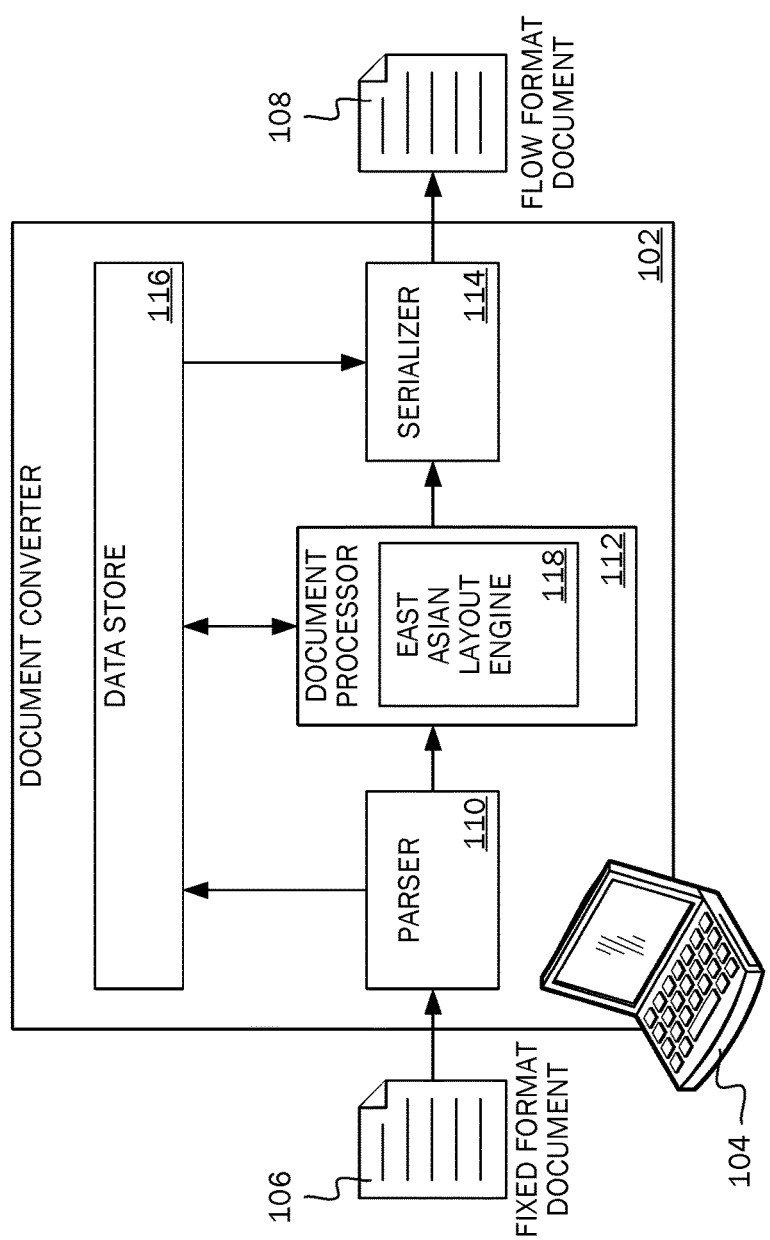
FIG. 1 is a block diagram of one embodiment of a system including a document converter.

As briefly described above, embodiments of the present invention are directed to providing detection of vertical text in a fixed format document and restructuring of the vertical text when converting a fixed format document to a flow format document. Upon detection of vertically written text, the vertical text may be rotated such that it may be processed for layout analysis. Vertically written text may introduce specific features, such as horizontal-in-vertical text, where horizontal run may be included in a vertical line of text. Embodiments of the present invention provide for detection of horizontally written pieces of text within a vertical line in a fixed format document and restructuring of the horizontal-in-vertical text when converting a fixed format document to a flow format document.

Embodiments of the present invention are also directed to providing detection of ruby text in association with a corresponding ruby base text in a fixed format document and restructuring of the ruby text when converting a fixed format document to a flow format document.

Additionally, embodiments of the present invention are directed to detection of a particular East Asian language in a fixed format document and determining which font to use for text in the detected language when converting a fixed format document to a flow format document.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 illustrates one embodiment of a system 100 incorporating an East Asian Layout Engine 118. In the illustrated embodiment, the East Asian Layout Engine 118 operates as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the East Asian Layout engine 118 of the present invention). Finally, the serializer 114 writes the flowable elements into a flowable document format (e.g., a word processing format).

Figure 2:
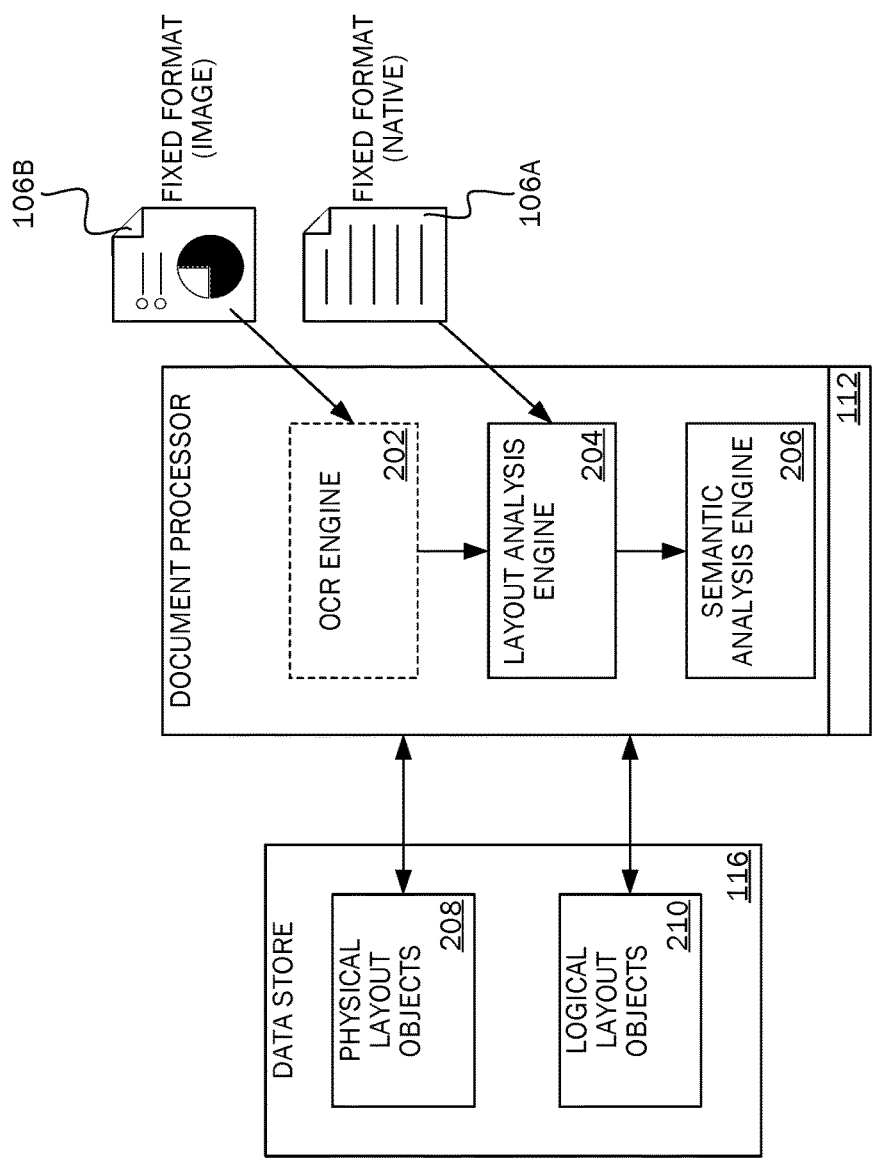
FIG. 2 is a block diagram showing an operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects 208 include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical layout objects 210 include flowable elements such as sections, paragraphs, columns, tables, and lists.

Where processing begins depends on the type of fixed format document 106 being parsed. A native fixed format document 106A created directly from a flow format source document contains some or all of the basic physical layout elements. The embedded data objects are extracted by the parser and are available for immediate use by the document converter; although, in some instances, minor reformatting or other minor processing is applied to organize or standardize the data. In contrast, all information in an image-based fixed format document 106B created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

Figure 3A:
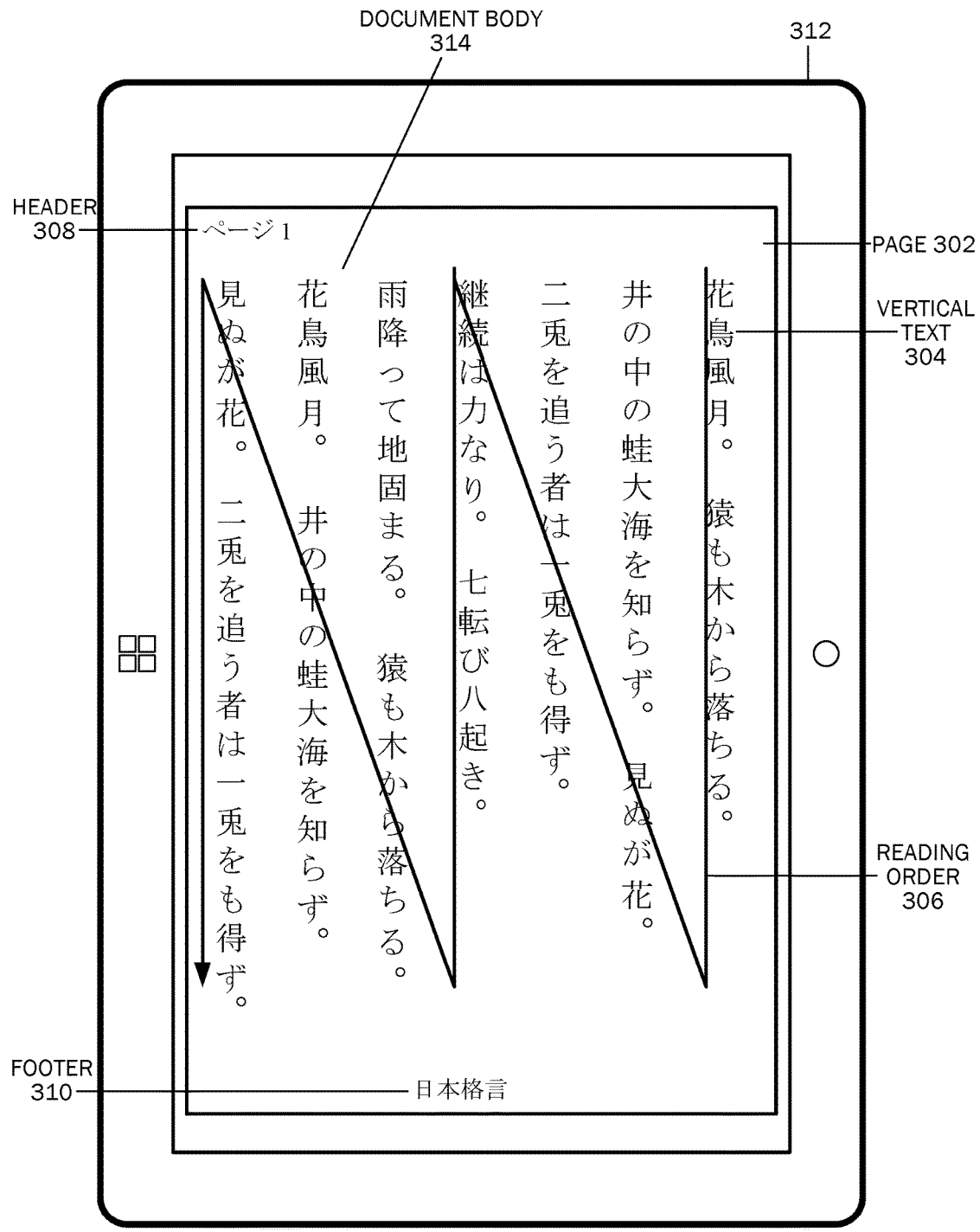
FIG. 3A is an illustration of a page of a fixed format document with vertical text.

As described briefly above, many East Asian scripts, such as Chinese, Japanese, and Korean, may be oriented in either a horizontal or vertical direction. Referring now to FIG. 3A, an example page 302 comprising vertical text 304 is shown displayed on a tablet computing device 312. Also shown is a reading order 306 of the vertical text 304. As illustrated, when oriented in a vertical direction, the reading order 306 of CJK scripts may be from top to bottom and from right to left. According to embodiments, when converting a fixed format document 106 into a flow format document 108, a direction in which text is written may be recognized, for example, so that behavior of the layout analysis engine 204 may be adapted accordingly. To support reconstruction of a vertically written document, vertical text detection may be provided.

Figure 3B:
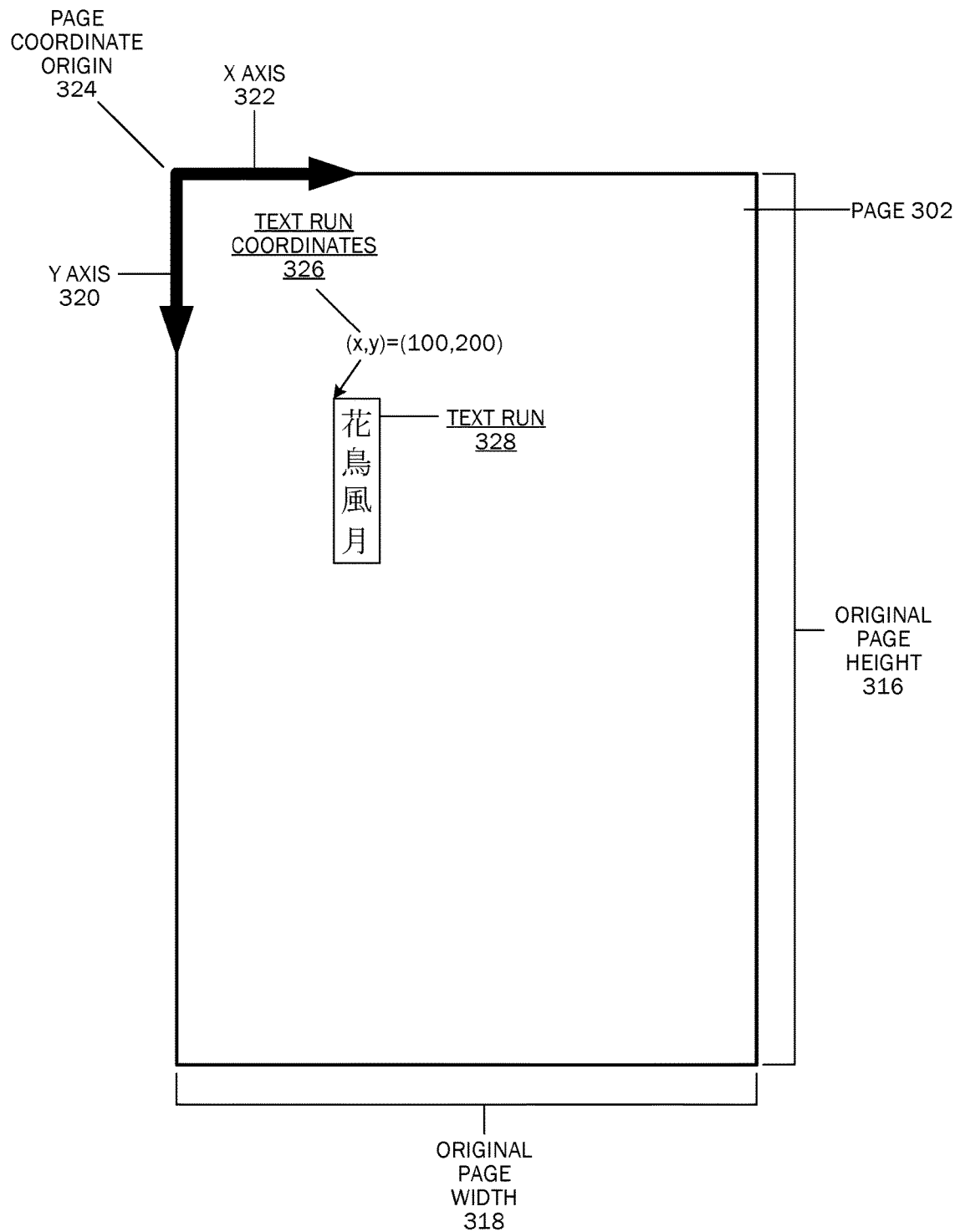
FIG. 3B is an illustration of the page of FIG. 3A showing a coordinate origin of the page and coordinates of a text run.

FIG. 3B shows the example page 302 of FIG. 3A showing positioning of coordinates 320,322,324,326 that may be utilized by the system for layout analysis for vertical text 304 in a fixed formate document 106. As illustrated, a page coordinate origin 324 may be placed in the upper left corner of the page 302. Additionally, an example text run 328 is shown with a text run coordinate origin 326 of (x,y)=(100, 200).

Figure 4:
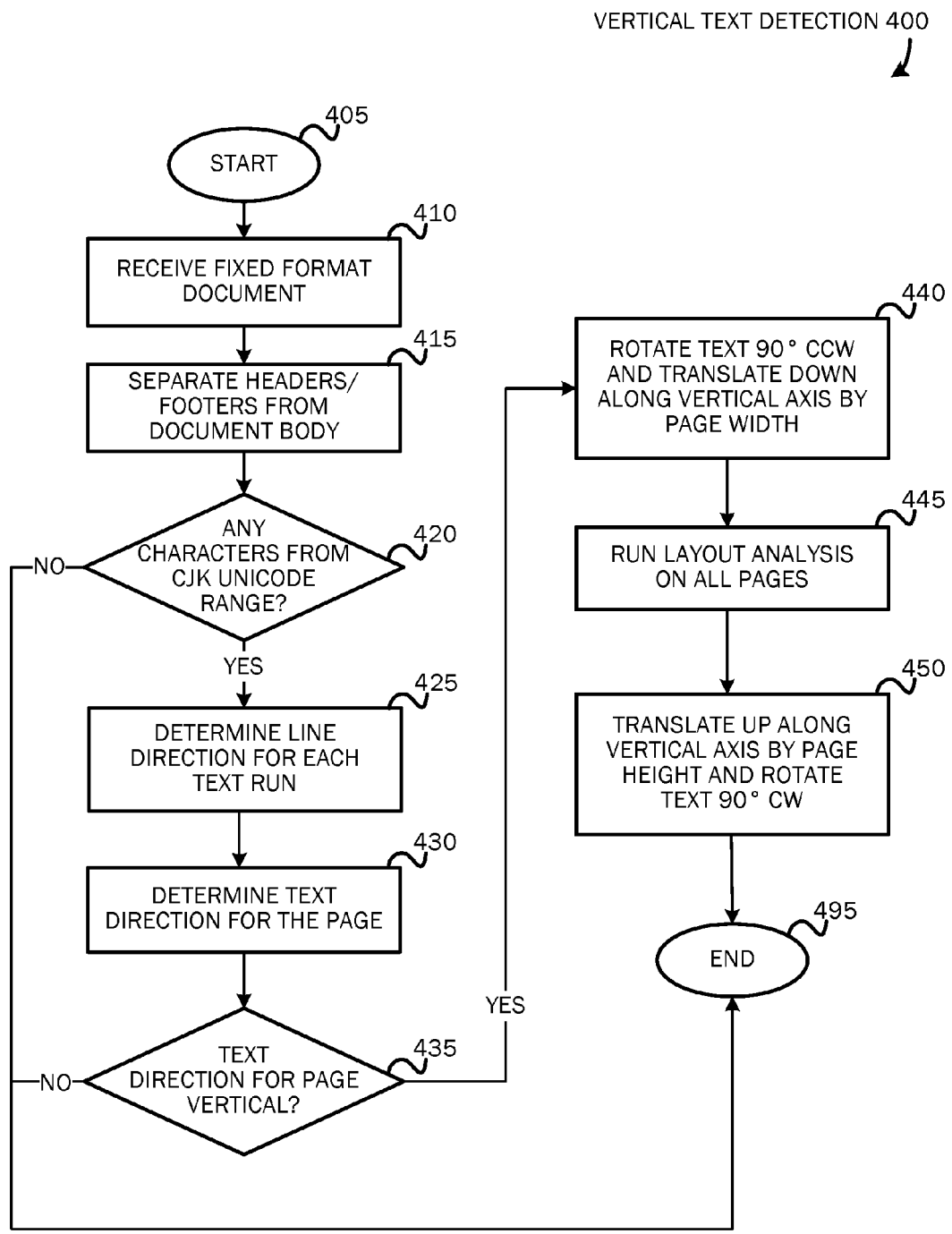
FIG. 4 is a flow chart of a method for detecting vertical text in a fixed format document.

FIG. 4 is a flow chart showing one embodiment of a vertical text detection method 400 executed by an East Asian Layout engine 118. The method 400 begins at START OPERATION 405 and proceeds to OPERATION 410 where a fixed format document 106 is received for analysis and for detection of vertical text 304 and for reconstructing the fixed format document 106 into a flow format document 108 where vertical text 304 may be reconstructed in the flow format document 108.

At OPERATION 415, header and footer detection may be performed for detecting and separating any headers 308 and/or footers 310 from the rest of the document body 314 of the received fixed format document 106. After analyzing headers 308 and footers 310 and separating their contents from the rest of the document body 314, the method 400 may proceed to OPERATION 420, where a determination is made by the East Asian Layout Engine 118 as to whether the document 106 comprises Chinese, Japanese, or Korean text. According to one embodiment, the determination may be made by analyzing a page 302 to determine if any characters within a Unicode range of the CJK languages are found. As is well known in the art, Unicode is an ordered character set of characters covering the majority of writing systems in the world, allowing multiple writing systems to co-exist in one data file. Systems which recognize Unicode may consistently read and process data from many languages. Unicode values may be associated with each character of a language, the Unicode values falling within a range specific to the language or a range shared amongst several languages.

If a character within a Unicode range of the CJK languages is not found on a page 302, the method 400 may end at OPERATION 495. Alternatively, if a page 302 comprises a character within a Unicode range of the CJK languages, the method 400 may proceed to OPERATION 425, where text runs may be analyzed to determine a line direction for each text run. According to an embodiment, text runs may be analyzed in horizontal lines and in vertical lines, and may be analyzed by their positions relative to each other. A line direction for a text run may be determined to be horizontal if the text run fits a horizontal sequence, and a line direction for a text run may be determined to be vertical if the text run fits a vertical sequence.

According to an embodiment, when detecting whether a text run 328 belongs to a horizontal or to a vertical line, two properties of text runs 328 may be observed. Identifying information of a vertical line may be set in a font, for example, an "isVertical flag" may be set in the font of a text run 328 suggesting that text runs 328 written in the font belong to vertical lines. The identifying information may be detected and extracted to determine a line direction for each text run 328. Identifying information may not be set in a font. In this case, additional information may be observed. According to an embodiment, an order in which text runs 328 are drawn on a screen (i.e., rendering order) may be observed. Most often, a rendering order of text runs 328 may correspond with the reading order 306 of text runs 328.

Utilizing the identifying information and/or the rendering order, text runs 328 may be grouped in lines. Iterating through text runs 328 in an order imposed by the rendering order of the text runs 328, if a text run 328 is observed to be vertical (i.e., isVertical flag set to true), the text run 328 may be analyzed to determine if it is a continuation of a previously detected vertical line. According to an embodiment, the text run 328 may be analyzed to see if it fits geometrically to a previously detected vertical line. For example, a determination may be made as to whether the text run 328 is positioned below a last character in the previously detected vertical line, and if the text run 328 is not offset horizontally from the previously detected vertical line by more than a predetermined amount. If the text run 328 is determined to not be a continuation of a vertical line, it may be determined to be a beginning of a new vertical line.

When iterating through the text runs 328, if extracted identifying information of a text run 328 suggests that the text run 328 is not vertical (i.e., isVertical flag set to false), the text run 328 may be analyzed to determine if the text run 328 is a continuation of a last previously detected line, including both horizontal and vertical lines). That is, a determination may be made as to whether a text run 328 fits geometrically to a previously detected horizontal or vertical line. If the last previously detected line is vertical, the text run 328 may be determined as a continuation of the last previously detected vertical line if the text run 328 is positioned below a last character in the line and is not offset horizontally from the line by more than a predetermined amount. If the last previously detected line is horizontal, the text run 328 may be determined as a continuation of the last previously detected horizontal line if the text run 328 is positioned to the right of a last character in the line and is not offset vertically from the line by more than a predetermined amount. If the text run 328 is determined to not be a continuation of a last previously detected horizontal line, it may be determined to be a beginning of a new horizontal line.

The method 400 may proceed to OPERATION 430, where horizontal and vertical lines of text runs may be further analyzed to determine a text direction for the page 302. According to an embodiment, characters in horizontal lines may be counted, and characters in vertical lines may be counted. At DECISION OPERATION 435, a determination is made by the East Asian Layout Engine 118 as to whether the text direction for the page 302 is horizontal or vertical by determining whether more characters are in the horizontal lines or the vertical lines. For example, if more characters are counted in the vertical lines, a determination may be made that the text direction for the page 302 is vertical 304.

Figure 5B:
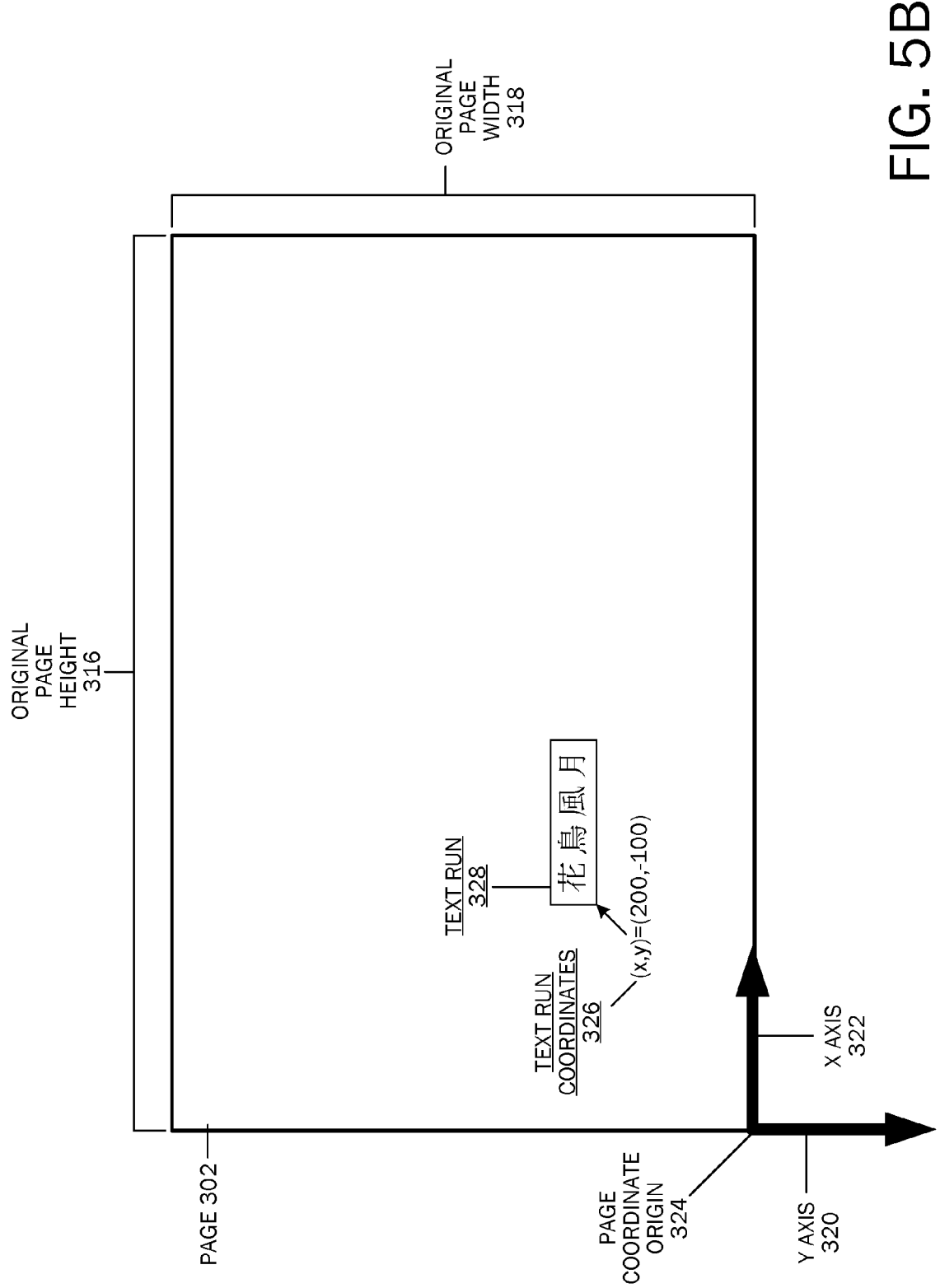
FIG. 5B is an illustration of the rotated page of FIG. 5A with the original coordinates transformed.

If the text direction for the page 302 is determined to be vertical 304, the method 400 may proceed to OPERATION 440, where the page 302 and its contents (i.e., text runs 328 in the document body 314) may be rotated by ninety degrees (90°) counterclockwise (CCW), as illustrated in FIG. 5A, and translated down along the vertical axis by page width. Accordingly, the vertical text 304 may be displayed as horizontal text 504, and the reading order 306 flowing from left to right with successive rows going from top to bottom. The translation may be performed for positioning of the coordinate system (illustrated in FIG. 3B) used internally by the system 100. After rotating the page 302 and its contents by ninety degrees (90°) counterclockwise (CCW), the original page coordinate origin 324 may be observed to start from the bottom left corner of the rotated page 302 as illustrated in FIG. 5B. In order to have the page coordinate origin 324 in the upper left corner of the rotated page 302, the page 302 and its contents (i.e., text runs 328 in the document body 314) may be translated by the original page width 318 down along the vertical axis 320. That is, the original page width 318 may be added to the y coordinate of every element (e.g., text runs 328) on the page 302. This may appear as if the contents of the page 302 have moved down the vertical axis 320, as depicted in FIG. 5C.

Figure 5C:
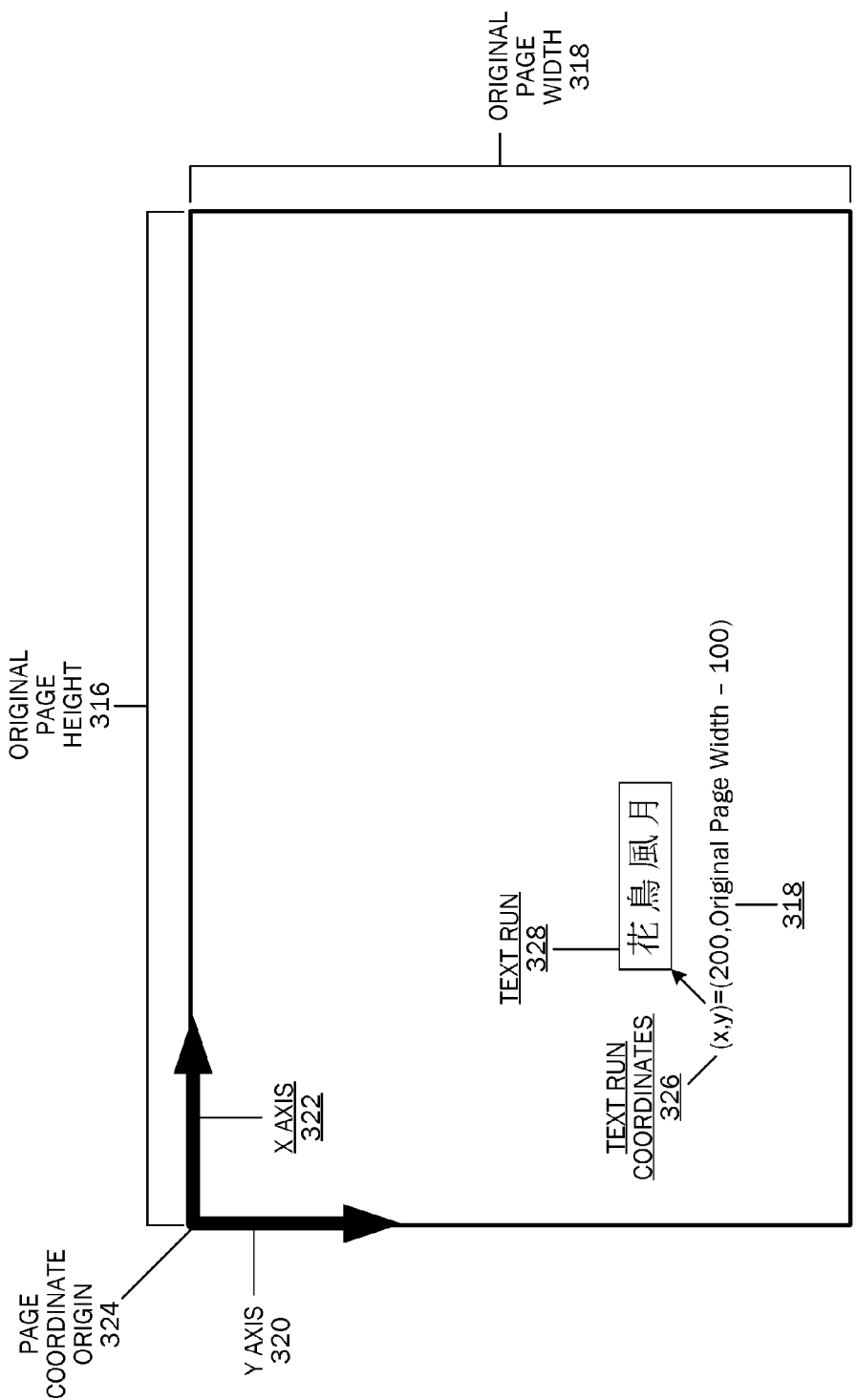
FIG. 5C is an illustration of the rotated page of FIGS. 5A and 5B with the coordinate origin moved to the upper left corner of the rotated page.

FIG. 5C shows the page 302 after the page 302 and its contents have been be translated by the original page width 318 down along the vertical axis 320. As illustrated, the page coordinate origin 324 is now located in the upper left corner of the rotated page 302, and the text run coordinates 326 have changed from (x,y)=(200,−100) after rotation to (x,y)= (200,Original Page Width−100) after translation.

Referring back to FIG. 4, with vertical text 304 now rotated to horizontal text 504 and the reading order 306 flowing from left to right with successive rows going from top to bottom, such as in European languages, the method 400 proceeds to OPERATION 445, where a layout analysis may be ran on all pages 302 in the fixed format document 106. The layout analysis may be performed to analyze the layout of the fixed format document 106. The layout analysis may include one or more of a whitespace detection operation, a vector graphic classification engine, a region detection operation, a line detection operation, a words-per-line detection operation, a basic graphic aggregation expansion operation, a region post-processing operation, a subscript/superscript detection operation, a borderless table detection operation, a page column detection operation, an in-region paragraph detection operation, a footnote/endnote detection operation, and a page margin detection operation. For more information about layout analysis, please see U.S. patent application Ser. No. 13/521,378 titled "Fixed Format Document Conversion Engine" filed on Jul. 10, 2012.

After the layout analysis is complete, the method 400 may proceed to OPERATION 450, where all pages 302 detected as vertical and rotated at OPERATION 440 may be rotated back to their original orientation. According to an embodiment, elements on the page 302 may be translated up along the vertical axis by page height 316, and the document body 314 may be rotated by ninety degrees (90°) clockwise (CW). The translation operation may include translating the page 302 and contents as described above with respect to FIGS. 3B, 5B, and 5C, but in reverse order after layout analysis has been performed. The page 302 and contents may be returned to their original coordinates 320,322,324,326). The method 400 ends at OPERATION 495.

Embodiments of the present invention provide for ruby text detection. Oftentimes in East Asian texts, ruby text may be provided as a pronunciation guide for characters. For example, ruby text may be used to clarify rare, nonstandard, or ambiguous words, to help a reader with pronunciation of names, to help with pronunciation of characters from another language, or in children's or learners' materials. To support reconstruction of ruby text, ruby text detection may be provided.

Figure 6:
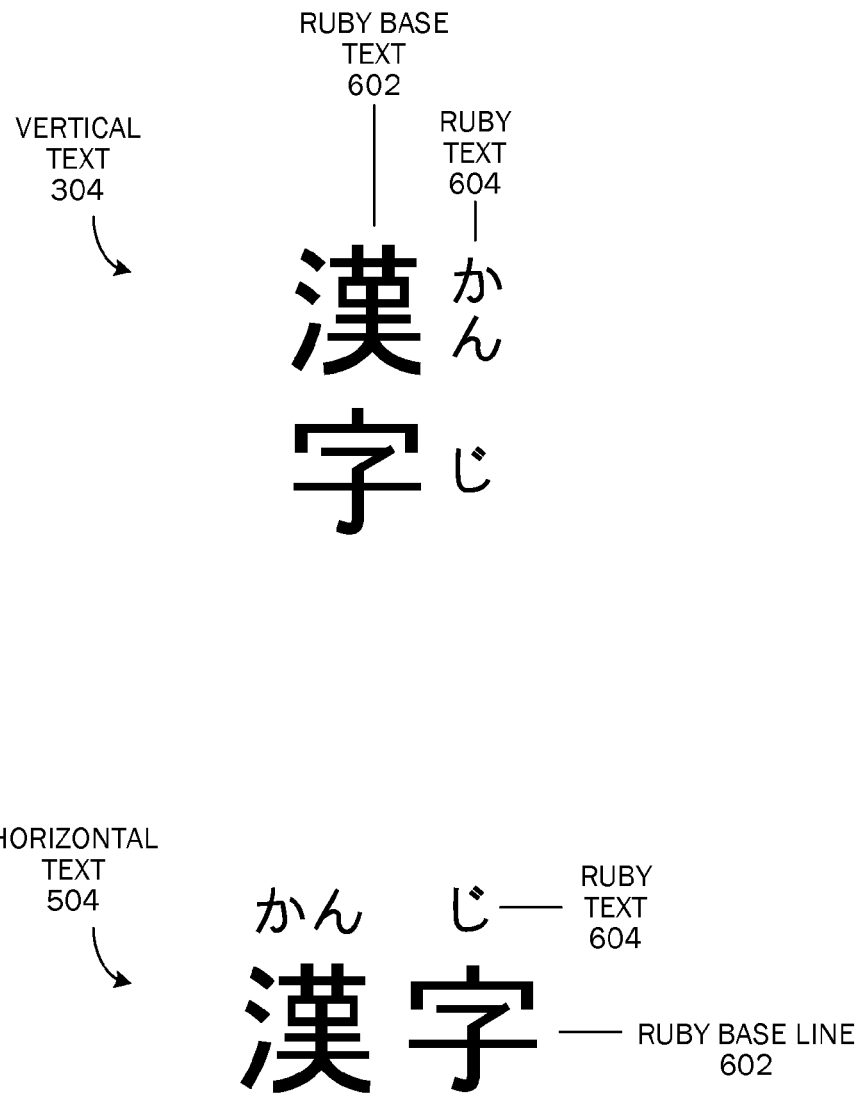
FIG. 6 is an illustration of ruby text.

Referring now to FIG. 6, an example of ruby text 604 is illustrated. As illustrated, ruby text 604 may be used with both vertical 304 and horizontal text 504. When used with vertical text 304, ruby text 604 may be placed to the right of a corresponding ruby base text 602 (i.e., character, word, or phrase for which the ruby text 604 is provided). When used with horizontal text 504, ruby text 604 may be placed above the corresponding ruby base text 602. The example ruby base text 602 illustrated in FIG. 6 spells the word "kanji," which is written using two kanji characters: 漢 (kan, written in hiragana in the ruby text 604 as かん), and 字 (ji, written in hiragana in the ruby text 604 as じ).

Figure 7A:
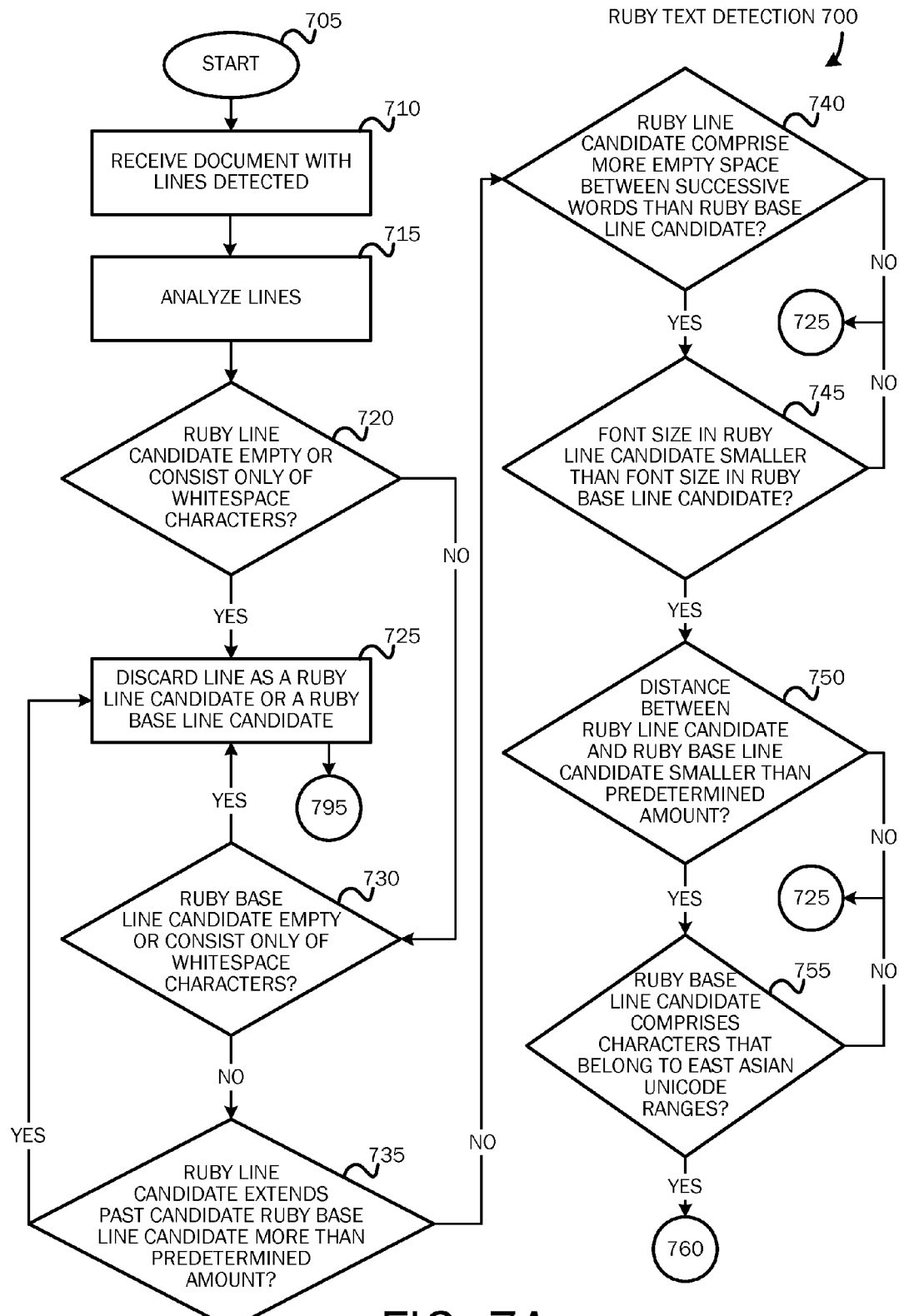
FIGS. 7A and 7B are a flow chart of a method for detecting ruby text in a fixed format document.
Figure 7B:
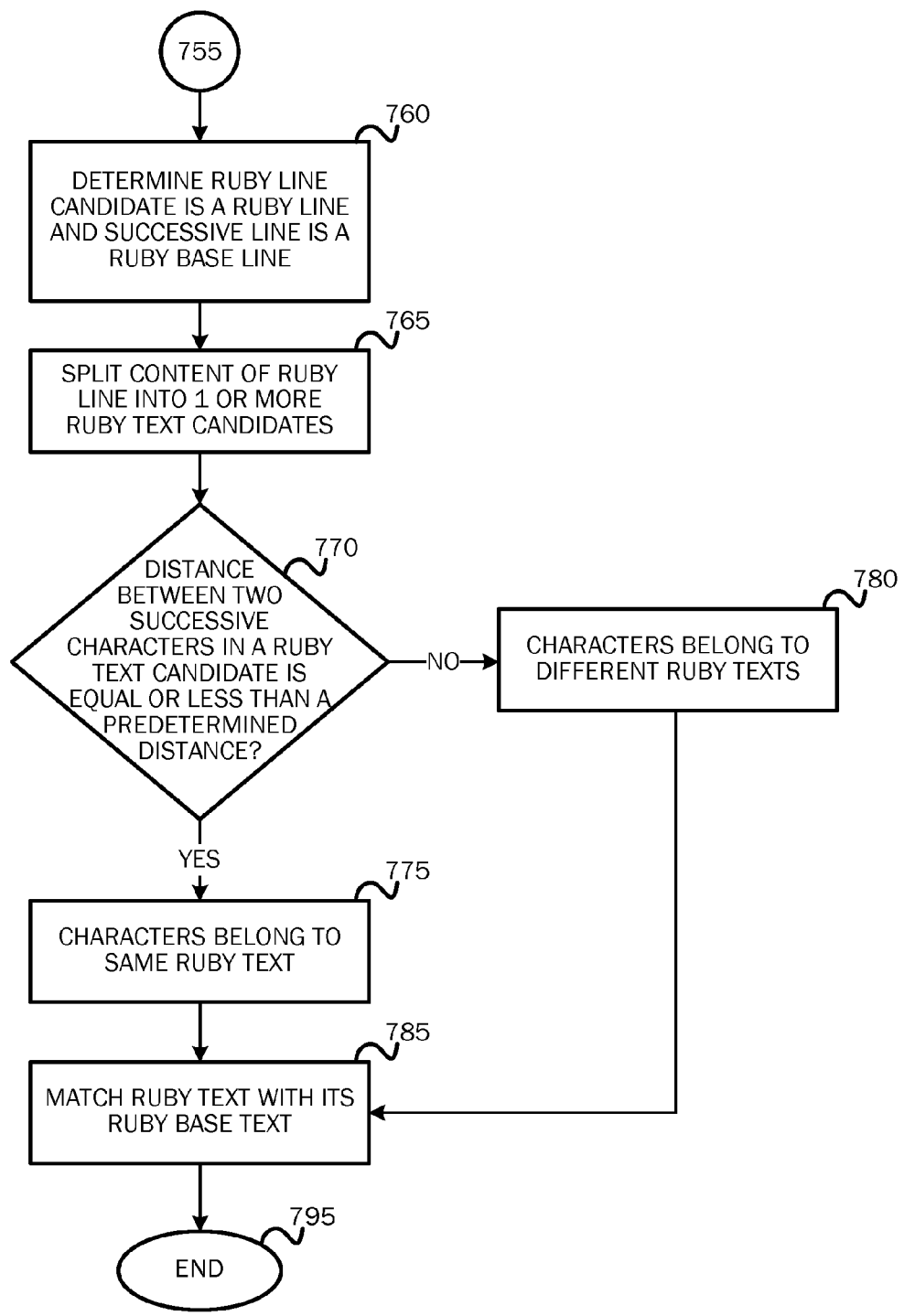
Figure 8:
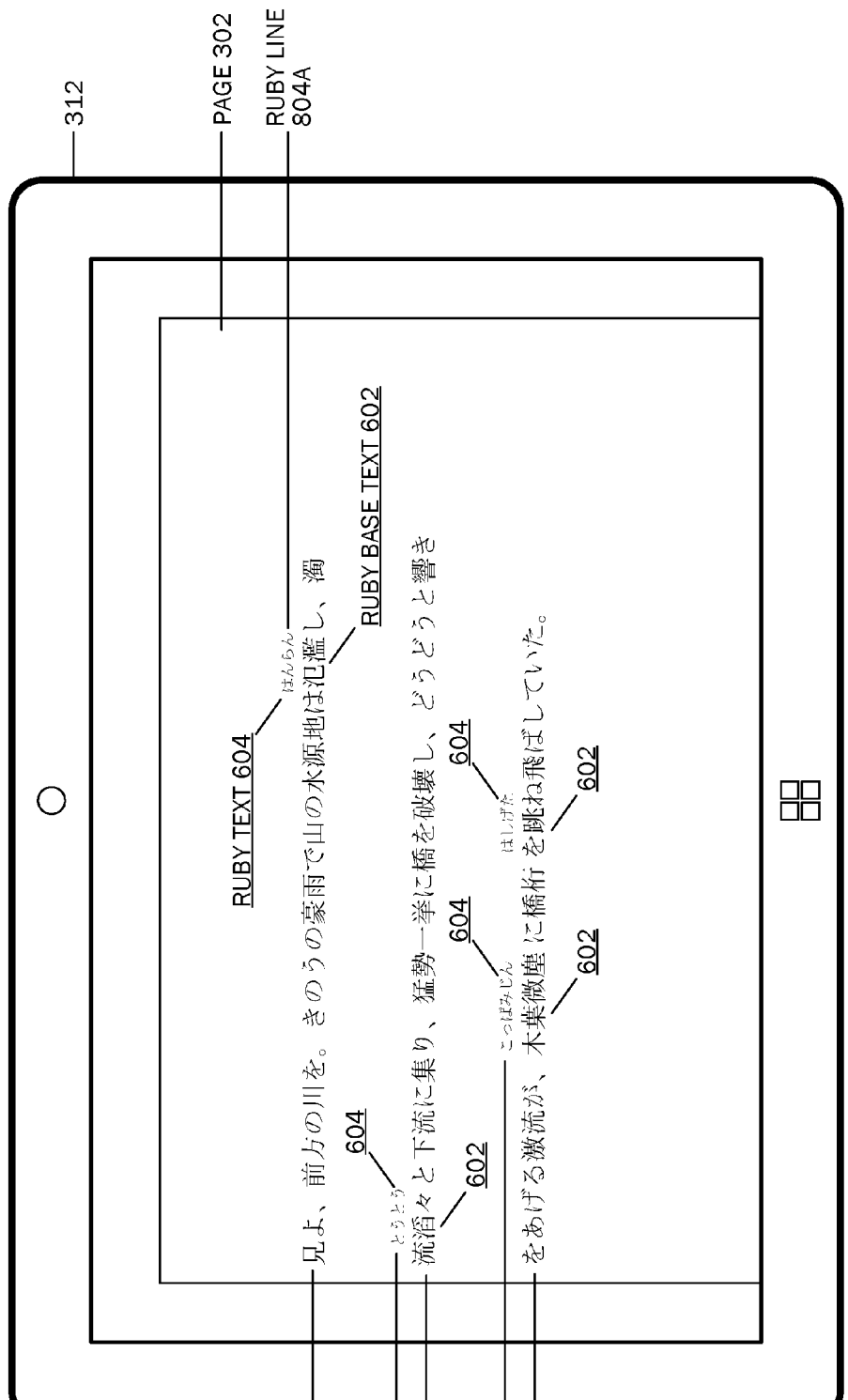
FIG. 8 is an illustration of ruby text displayed in a fixed format document.

FIGS. 7A and 7B illustrate a flow chart showing one embodiment of a ruby text detection and reconstruction method 700 executed by the East Asian Format Engine 118 for detecting ruby text 604 in a fixed format document 106 and for reconstructing the ruby text 604 in an associated flow format document 108. Reference may be made to FIG. 8, which illustrates ruby text 604 in a fixed format document 106. The method 700 begins at START OPERATION 705 and proceeds to OPERATION 710 where a fixed format document 106 having lines of text is received for analysis and for detection of ruby text 604 and for reconstructing the fixed format document 106 into a flow format document 108 where ruby text 604 may be reconstructed in the flow format document 108. According to an embodiment, line detection may be performed by a line detection engine before the fixed format document 106 is received. Line detection may separate the fixed format document 106 into one or more individual lines that may be further analyzed for detecting ruby text 604, as described herein.

The method 700 may proceed to OPERATION 715, where lines may be analyzed for attributes of a ruby line 804, wherein a ruby line 804 is a line of text comprising ruby text 604, and attributes of a ruby base line 802, wherein a ruby base line 802 is a line of text comprising ruby base text 602. At DECISION OPERATION 720, a determination is made as to whether a line, which may be considered a ruby line 804 candidate, is empty or consists only of whitespace characters. If the line is empty or consists only of whitespace characters, the method 700 may proceed to OPERATION 725, where the line may be discarded as a ruby line 804 candidate. Alternatively, if the line is not empty and consists of one or more characters other than a whitespace character, the method 700 may proceed to DECISION OPERATION 730, where a determination is made as to whether a line, which may be considered a ruby base line 802 candidate, is empty or consists only of whitespace characters.

If the line is empty or consists only of whitespace characters, the method 700 may proceed to OPERATION 725, where the line may be discarded as a ruby base line 802 candidate. Alternatively, if the line is not empty and consists of one or more characters other than a whitespace character, the method 700 may proceed to DECISION OPERATION 735, where a determination is made as to whether the ruby line 804 candidate, extends more than a predetermined distance beyond a successive line (i.e., ruby base line 802 candidate). In the case of horizontal text 504, the successive line (i.e., ruby base line 802 candidate) may be below the ruby line 804 candidate, and in the case of vertical text 304, the successive line (i.e., ruby base line 802 candidate) may be to the left of the ruby line 804 candidate. According to an embodiment, a determination may be made as to whether the ruby line 804 candidate extends more than an average width of a character on the page 304 to the left or right of the ruby base line 802 candidate.

If a determination is made that the ruby line 804 candidate extends more than the predetermined amount to the left or right of the ruby base line 802 candidate, the method 700 may proceed to OPERATION 725, where the line may be discarded as a ruby line 804 candidate. Alternatively, if the ruby line 804 candidate does not extend more than the predetermined amount to the left or right of the ruby base line 802 candidate, the method 700 may proceed to DECISION OPERATION 740, where a determination may be made as to whether the ruby line 804 candidate comprises more empty space (i.e., space between successive words) than the successive line (i.e., ruby base line 802 candidate).

If a determination is made that the ruby line 804 candidate does not comprise more space between successive words than the ruby base line 802 candidate, the method 700 may proceed to OPERATION 725, where the line may be discarded as a ruby line 804 candidate. Alternatively, if the ruby line 804 candidate comprises more empty space than the ruby base line 802 candidate, the method 700 may proceed to DECISION OPERATION 745, where a determination may be made as to whether a font size of text in the ruby line 804 candidate is smaller than a font size of text in the successive line (i.e., ruby base line 802 candidate).

If a determination is made that the font size of text in the ruby line 804 candidate is not smaller than the font size of text in the ruby base line 802 candidate, the method 700 may proceed to OPERATION 725, where the line may be discarded as a ruby line 804 candidate. Alternatively, if the font size of text in the ruby line 804 candidate is determined to be smaller than the font size of text in the ruby base line 802 candidate, the method 700 may proceed to DECISION OPERATION 750, where a determination may be made as to whether a distance between the ruby line 804 candidate and the successive line (i.e., ruby base line 802 candidate) is smaller than a predetermined amount. According to an embodiment, a determination may be made as to whether distance between the ruby line 804 candidate and the ruby base line 802 candidate is less than a height of the ruby line 804 candidate.

If a determination is made that the distance between the ruby line 804 candidate and the ruby base line 802 candidate is greater than the predetermined amount, the method 700 may proceed to OPERATION 725, where the line may be discarded as a ruby line 804 candidate. Alternatively, if the distance between the ruby line 804 candidate and the ruby base line 802 candidate is less than the predetermined amount, the method 700 may proceed to DECISION OPERATION 755, where a determination may be made as to whether the ruby line 804 candidate comprises characters that belong to an East Asian Unicode range. A table of East Asian Unicode ranges 1202,1204 is illustrated in FIG. 12.

If a determination is made that the ruby line 804 candidate does not comprise characters that belong to an East Asian Unicode range 1202,1204, the method 700 may proceed to OPERATION 725, where the line may be discarded as a ruby line 804 candidate. Alternatively, if the ruby line 804 candidate comprises characters that belong to an East Asian Unicode range 1202,1204, the method 700 may proceed to OPERATION 760, where the ruby line 804 candidate is determined to be a ruby line 804, and the successive line is determined to be a ruby base line 802.

The method 700 proceeds to OPERATION 765, where content of the ruby line 804 may be split into one or more ruby text 604 candidates. At DECISION OPERATION 770, a determination may be made as to whether the distance between two successive characters in a ruby text 604 candidate is less than a predetermined distance. According to an embodiment, a determination may be made as to whether the distance between two successive characters in a ruby text 604 candidate is equal to or less than the width of a character.

If a determination is made that the distance between two successive characters in a ruby text 604 candidate is not greater than the predetermined distance, the method 700 may proceed to OPERATION 775, where the two characters may be determined to be in a same ruby text 604. Alternatively, if a determination is made that the distance between two successive characters in a ruby text 604 candidate is greater than the predetermined distance, the method 700 may proceed to OPERATION 780, where the two characters may be determined to be in different ruby texts 604.

At OPERATION 785, ruby text 604 may be assigned with a corresponding ruby text base 602. According to an embodiment, characters below ruby text 604 may be assigned as a corresponding ruby text base 602. The method 700 ends at OPERATION 795.

Figure 9:
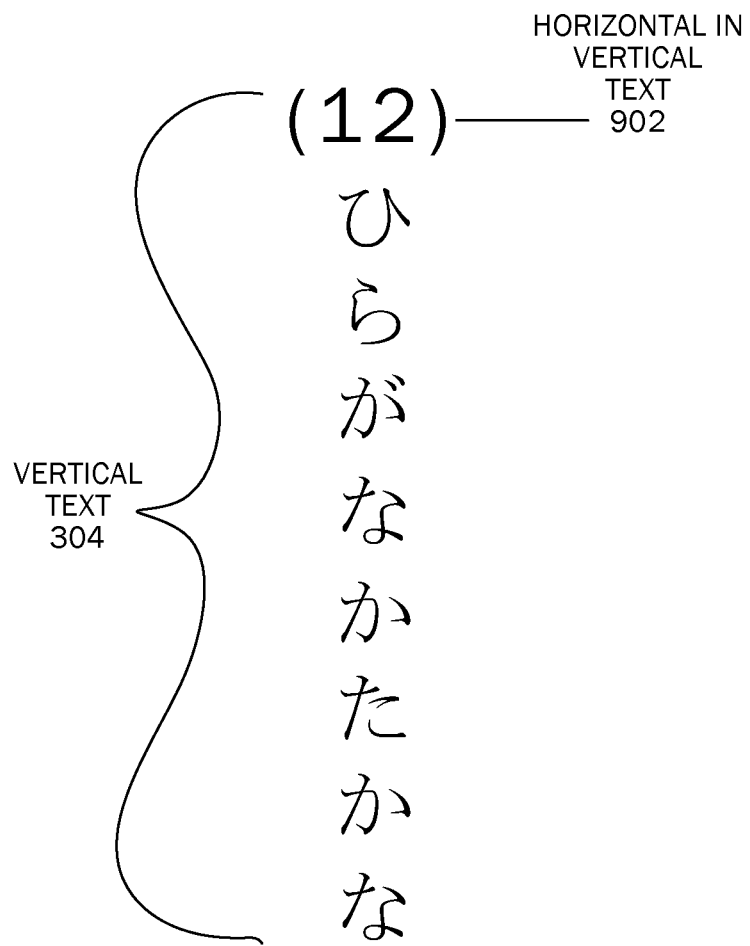
FIG. 9 is an illustration of vertical text comprising horizontal-in-vertical text.

Sometimes when text is written vertically 304, multiple characters may be displayed horizontally in an area reserved for one vertical character. This may be referred to a horizontal-in-vertical text 902, and is illustrated in FIG. 9. For example, numbers and/or reference marks may be written as horizontal-in-vertical text 902. Embodiments provide horizontal-in-vertical text detection and reconstruction such that when converting a fixed format document 106 with horizontal-in-vertical text 902 to a flow format document 108, horizontal-in-vertical text 902 may be recognized, and accordingly be reconstructed correctly.

Figure 10:
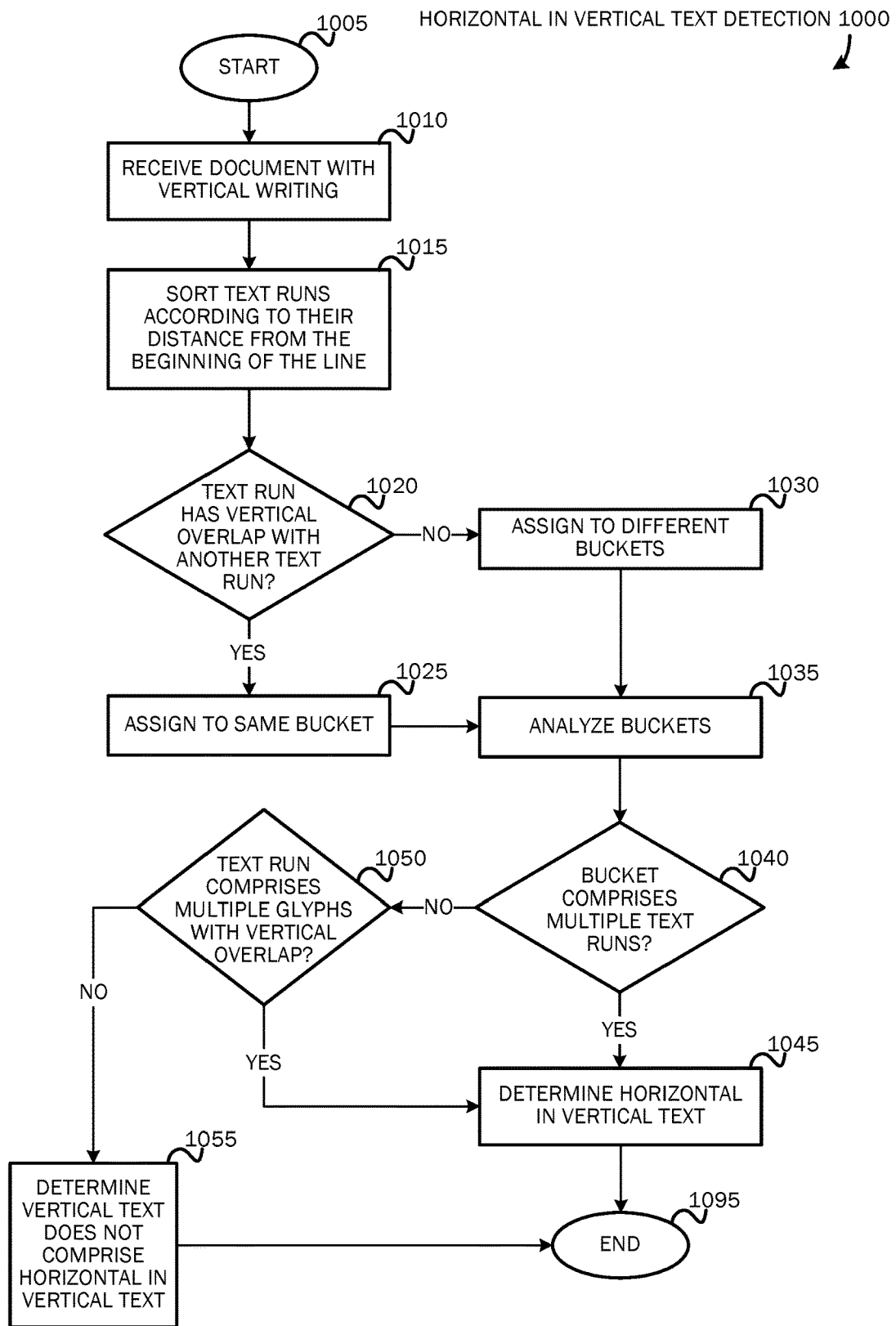
FIG. 10 is a flow chart of a method for detecting horizontal-in-vertical text.

FIG. 10 illustrates a flow chart showing one embodiment of a horizontal-in-vertical text 902 detection and reconstruction method 1000 executed by the East Asian Format Engine 118 for detecting horizontal-in-vertical text 902 in a fixed format document 106 and for reconstructing the horizontal-in-vertical text 902 in an associated flow format document 108. The method 1000 begins at START OPERATION 1005 and proceeds to OPERATION 1010 where a fixed format document 106 having vertical lines of text 304 is received for analysis and for detection of horizontal-in-vertical text 902 and for reconstructing the fixed format document 106 into a flow format document 108 where horizontal-in-vertical text 902 may be reconstructed in the flow format document 108. According to an embodiment, line detection may be performed by a line detection engine before the fixed format document 106 is received. Line detection may separate the fixed format document 106 into one or more individual lines that may be further analyzed for detecting horizontal-in-vertical text 902, as described herein. Text run detection may also be performed before the fixed format document 106 is received. According to an embodiment, a text run, which may include numbers, characters, reference marks, punctuation marks, etc.,) may be detected as one line.

Figure 11:
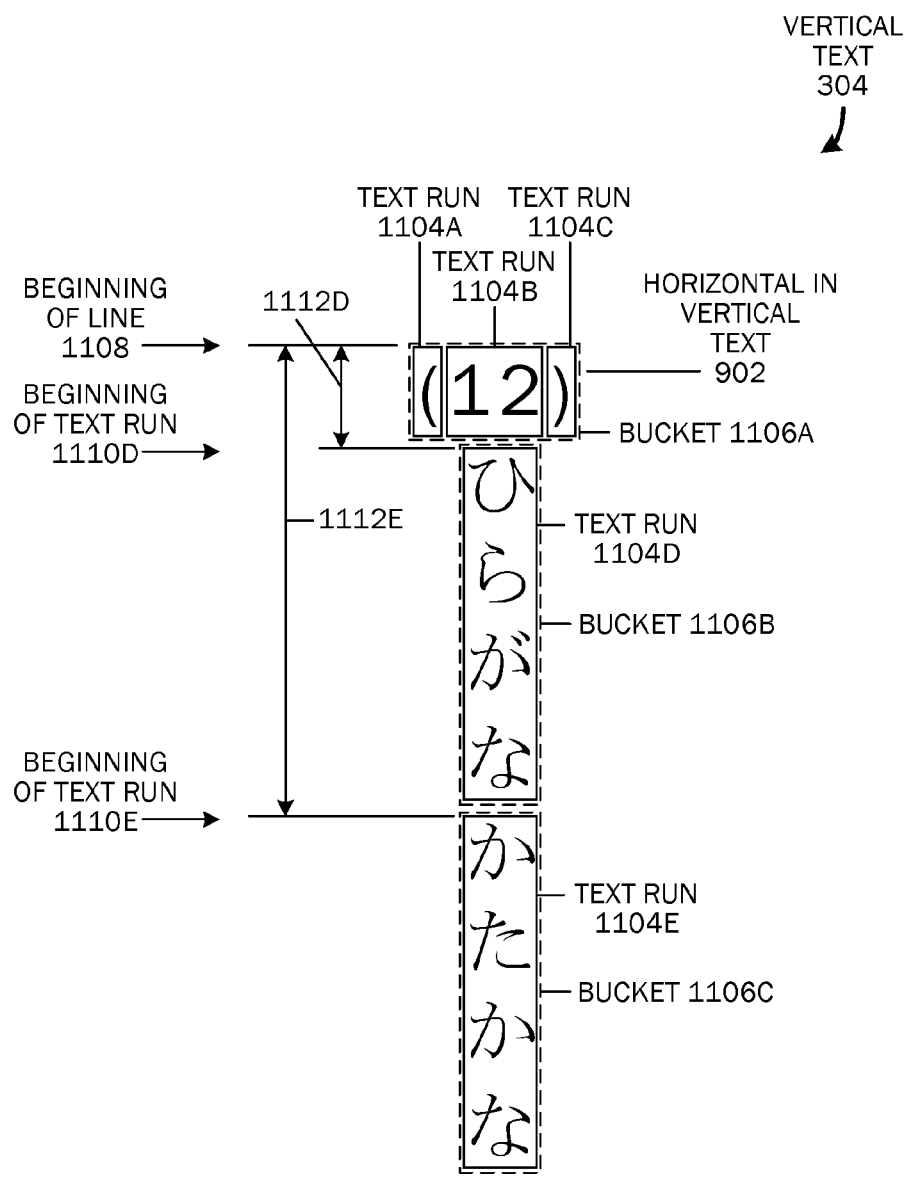
FIG. 11 is an illustration of vertical text separated into text runs and buckets.

A determination to distinguish whether characters in a horizontal-in-vertical text 902 are in a same text run or if a horizontal-in-vertical text 902 is divided into a plurality of text runs. To make this determination, the method 1000 may proceed to OPERATION 1015, where text runs 1104 may be sorted by their distance 1112 from the beginning of the line 1108. Referring now to FIG. 11, a vertical line of text 304 is shown. For example, the vertical line of text 304 may be included in a fixed format document 106. As this example case, the vertical line of text 304 comprises several text runs 1104, and the horizontal-in-vertical text 902 is divided into a plurality of text runs 1104A, 1104B, 1104C.

With reference back to FIG. 10, once text runs 1104 have been sorted by their distance 1112 from the beginning of the line 1108, the method 1000 may proceed to DECISION OPERATION 1020, where a determination may be made as to whether a text run 1104 has a vertical overlap with another text run. If a determination is made that text runs 1104 have a vertical overlap, the text runs 1104 may be assigned to a same bucket 1106 at OPERATION 1025. If a determination is made that text runs 1104 do not have a vertical overlap, the text runs 1104 may be assigned to different buckets 1106 at OPERATION 1030. For example, and as illustrated in FIG. 11, the top line of the vertical text 304 is slip into a plurality of text runs 1104A, 1104B, 1104C. A determination may be made that the three text runs 1104A, 1104B, 1104C have vertical overlap, and accordingly may be assigned to a same bucket 1106A. The example vertical text 304 may be comprises three buckets 1106: the first bucket 1106A containing two text runs 1104A,1104C containing brackets and one text run 1104B containing numbers; a second bucket 1106B containing a text run 1104D of Japanese text reading "ひらがな" or "hiragana;" and a third bucket 1106C containing a text run 1104E of Japanese text reading "かたかな" or "katakana."

Referring again to FIG. 10, the method 1000 may proceed to OPERATION 1035, where the buckets 1106 may be analyzed. At DECISION OPERATION 1040, a determination may be made as to whether a bucket 1106 comprises multiple text runs 1104. If a bucket 1106 comprises multiple text runs 1104, a determination may be made that the vertical text 304 comprises horizontal-in-vertical text 902 at OPERATION 1045. If a bucket 1106 has a single text run 1104, the method 1000 may proceed to DECISION OPERATION 1050 where a determination is made as to whether the text run 1104 may comprise a plurality of glyphs with vertical overlap.

If the text run 1104 comprises a plurality of glyphs with vertical overlap, a determination may be made that the vertical text 304 comprises horizontal-in-vertical text 902 at OPERATION 1045. Accordingly, the horizontal-in-vertical text 902 may be reconstructed correctly when converting the fixed format document 106 to a flow format document 108. Alternatively, if the text run 1104 does not comprise a plurality of glyphs with vertical overlap, the method 1000 may proceed to OPERATION 1055, where a determination may be made that the vertical text 304 does not comprise horizontal-in-vertical text 902. The method 1000 ends at OPERATION 1095.

When converting a fixed format document 106 written in an East Asian Language (e.g., Chinese, Japanese, or Korean) to a flow format document 108, choosing a correct font may ensure that the text may be displayed in a specific language when the document 106 is restructured. As is well known, Chinese, Japanese, and Korean languages share a range of Unicode characters 1204. The table 1200 illustrated in FIG. 12 lists various Unicode ranges 1202,1204 used in Chinese, Japanese, and Korean languages. For example, a range of Unicode values specific to the Japanese language may include Unicode values U+3040–U+309F (hiragana) 1202A and U+30A0–U+30FF (katakana) 1202B. A range of Unicode values specific to the Korean language may include Unicode values U+1100–U+11FF (Hangul Jamo) 1202C and U+AC00–U+D7AF (Hangul Syllables) 1202D. Common characters for CJK languages may include kanji (Unicode values U+4E00–U+9FCF) 1204A, ideographs (Unicode values U+F900–U+FAFF) 1204B, and radicals (Unicode values U+2F00–U+2FDF) 1204C.

East Asian languages share a range of Unicode characters whose graphical representation depends on what font is used. Detecting a language by analyzing the characters in each font may not be an ideal method since a document may comprise different fonts for different Unicode ranges. For example and with reference to FIG. 13, a paragraph 1300 comprising different fonts for different Unicode ranges is illustrated. As shown, the document may include characters specific to the Japanese language (written in hiragana 1202A or katakana 1202B) and common characters for CJK languages 1204. For purposes of illustration, the Japanese text 1202A,B is shown with a box drawn around the characters, and the common characters for CJK languages 1204 are shown underlined. If a simple per-font analysis is performed to detect a language, the font depicted with a box drawn around the characters may be detected as Japanese; however, the language of the font depicted as underlined may not be able to be determined.

Embodiments provide for East Asian language detection in a fixed format document 106. Instead of performing a simple per-font analysis, statistics for each font that includes the context in which characters from the font are used may be extracted. For example, the context may be determined by analyzing each paragraph 1300 in a document separately. For each font found in the document, a number of Japanese, Korean, and other CJK and non-CJK characters used in paragraphs 1300 in which the particular font is used may be tracked. Based on the statistics and various threshold values, a determination of a language of text may be determined.

Figure 14:
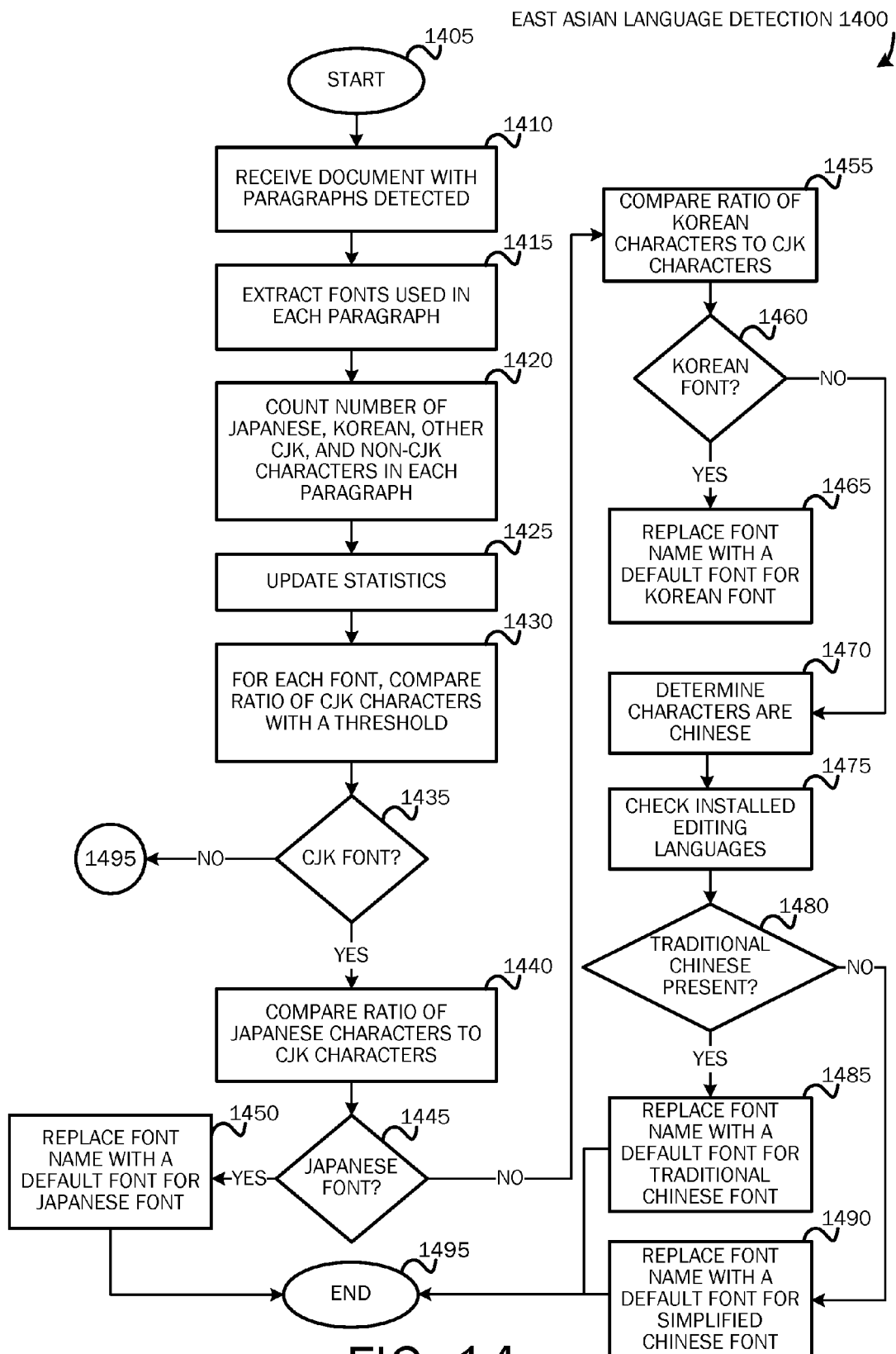
FIG. 14 is a flow chart of a method for detecting East Asian languages in a fixed format document.

FIG. 14 is a flow chart showing one embodiment of an East Asian language detection method 1400 executed by the East Asian Format Engine 118 for detecting an East Asian language in a fixed format document 106 and for reconstructing the East Asian language in an associated flow format document 108. The method 1400 begins at START OPERATION 1405 and proceeds to OPERATION 1410 where a fixed format document 106 having CJK characters is received for analysis and for detection of an East Asian language for a font and for reconstructing the fixed format document 106 into a flow format document 108 where the font for the determined East Asian language may be reconstructed in the flow format document 108. According to an embodiment, paragraph detection may be performed by a paragraph detection engine before the fixed format document 106 is received. Paragraph detection may separate the fixed format document 106 into one or more paragraphs 1300 that may be further analyzed for detecting an East Asian language, as described herein.

The method 1400 may proceed to OPERATION 1415, where each font used in a paragraph 1300 is detected and extracted. The number of Japanese characters 1202A, 1202B, Korean characters 1202C,1202D, other CJK characters 1204A,1204B,1204C, and non-CJK characters in the paragraph 1300 may be detected and counted at OPERATION 1420. For example, Unicode values for a character may be detected, and a language type (e.g., Japanese, Korean, other CJK, or non-CJK) for each character may be assigned. The numbers determined at OPERATION 1420 may be stored and used to update statistical information at OPERATION 1425. According to embodiments, to capture the context in which each particular font, which may help to solve the shortcomings of simple per font character counting as described in paragraph [0074], statistics for each font may be calculated based on the numbers obtained in OPERATION 1420 for each paragraph 1300. For each font, numerical values of each character type (Japanese, Korean, CJK, and non-CJK) may be calculated by aggregating appropriate numbers from each paragraph 1300 in which that particular font was used (that is, paragraphs 1300 that contain at least one character written in that font). At OPERATION 1430, the ratio of CJK characters (i.e., number of CJK characters divided by the total number of characters) for a font may be compared with a threshold value extracted from a training set.

The method 1400 proceeds to DECISION OPERATION 1435, where a determination is made as to whether the font is a CJK font. For example, if the ratio of CJK characters in a font exceeds the threshold value, a determination may be made that the font is a CJK font. If a font is determined to not be a CJK font, the method 1400 may end at OPERATION 1495. Alternatively, if the font is determined to be a CJK font, the method 1400 may proceed to OPERATION 1440, where, a ratio of Japanese characters 1202A,1202B in the font may be determined by dividing the number of Japanese characters 1202A,1202B by the total number of CJK characters.

At DECISION OPERATION 1445, a determination is made as to whether the font is Japanese by comparing the ratio of Japanese characters 1202A,1202B in the font to a threshold value. If the ratio meets or exceeds the threshold value, the font may be determined to be a Japanese font. At OPERATION 1450, the font name for the font determined to be a Japanese font may be replaced with a default font for Japanese font. If at DECISION OPERATION 1445, a determination is made that the font is not Japanese, the method 1400 may proceed to OPERATION 1455, where a ratio of Korean characters 1202C,1202D in the font may be determined by dividing the number of Korean characters 1202C, 1202D by the total number of CJK characters.

At DECISION OPERATION 1460, a determination is made as to whether the font is Korean by comparing the ratio of Korean characters 1202C,1202D in the font to a threshold value. If the ratio meets or exceeds the threshold value, the font may be determined to be a Korean font. At OPERATION 1465, the font name for the font determined to be a Korean font may be replaced with a default font for Korean font. If at DECISION OPERATION 1460, a determination is made that the font is not Korean, the method 1400 may proceed to OPERATION 1470, where the font may be determined to be Chinese.

A distinction between Simplified Chinese and Traditional Chinese may not be able to be made by looking a Unicode values. Accordingly, at OPERATION 1475, an installed editing language may be checked, and at DECISION OPERATION 1480, a determination is made as to whether Traditional Chinese is present. If Traditional Chinese is present, the method 1400 may proceed to OPERATION 1485, where the font is determined to be Traditional Chinese and the font name for the font determined to be a Traditional Chinese font may be replaced with a default font for Traditional Chinese font. Alternatively, if Traditional Chinese is not present, the method 1400 may proceed to OPERATION 1490, where the font is determined to be Simplified Chinese and the font name for the font determined to be a Simplified Chinese font may be replaced with a default font for Simplified Chinese font. The method 1400 may return to OPERATION 1430 for each font extracted from the document. The method 1400 ends at OPERATION 1495.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 15:
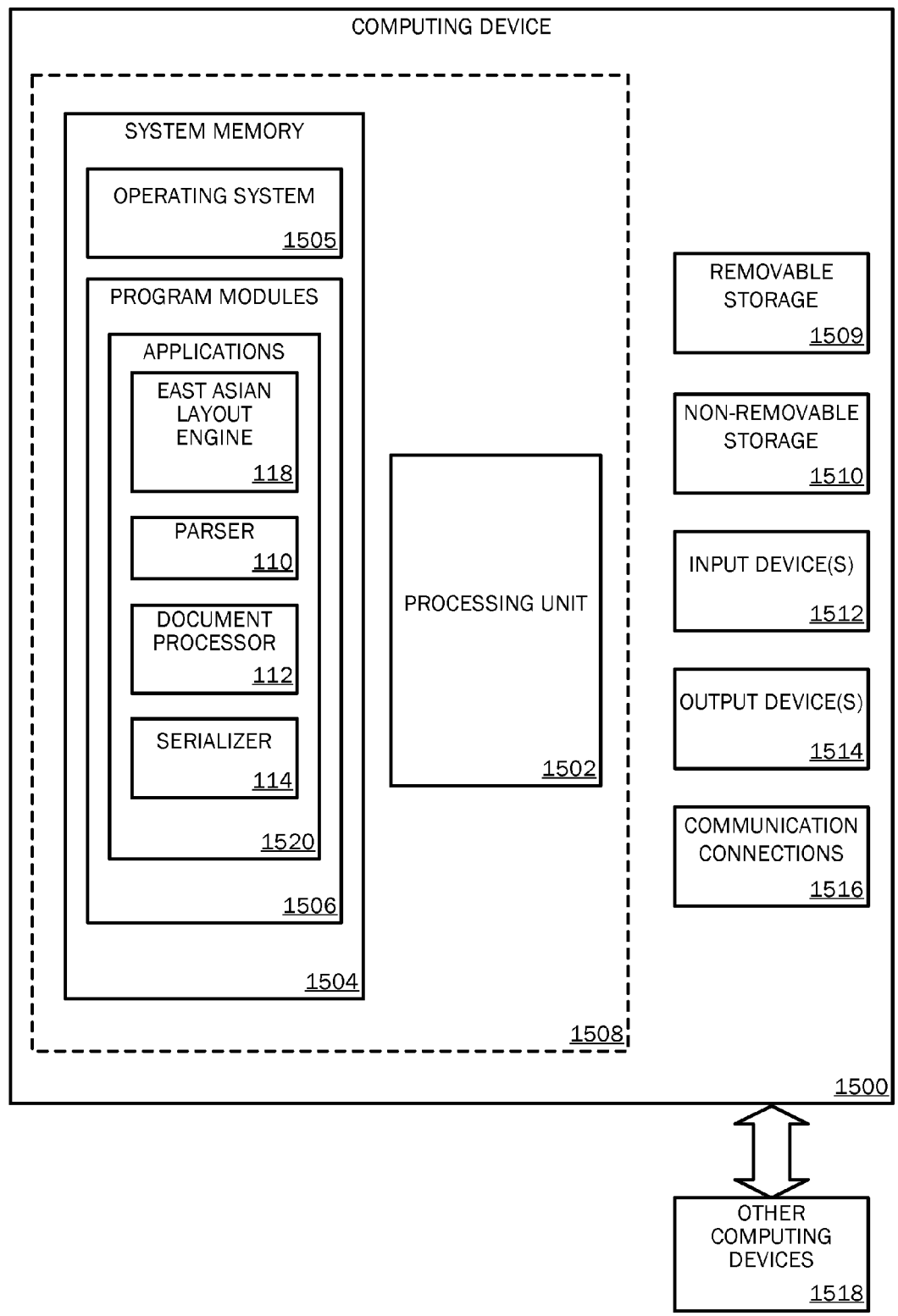
FIG. 15 is a block diagram illustrating example physical components of a computing device with which embodiments of the invention may be practiced.
Figure 16A:
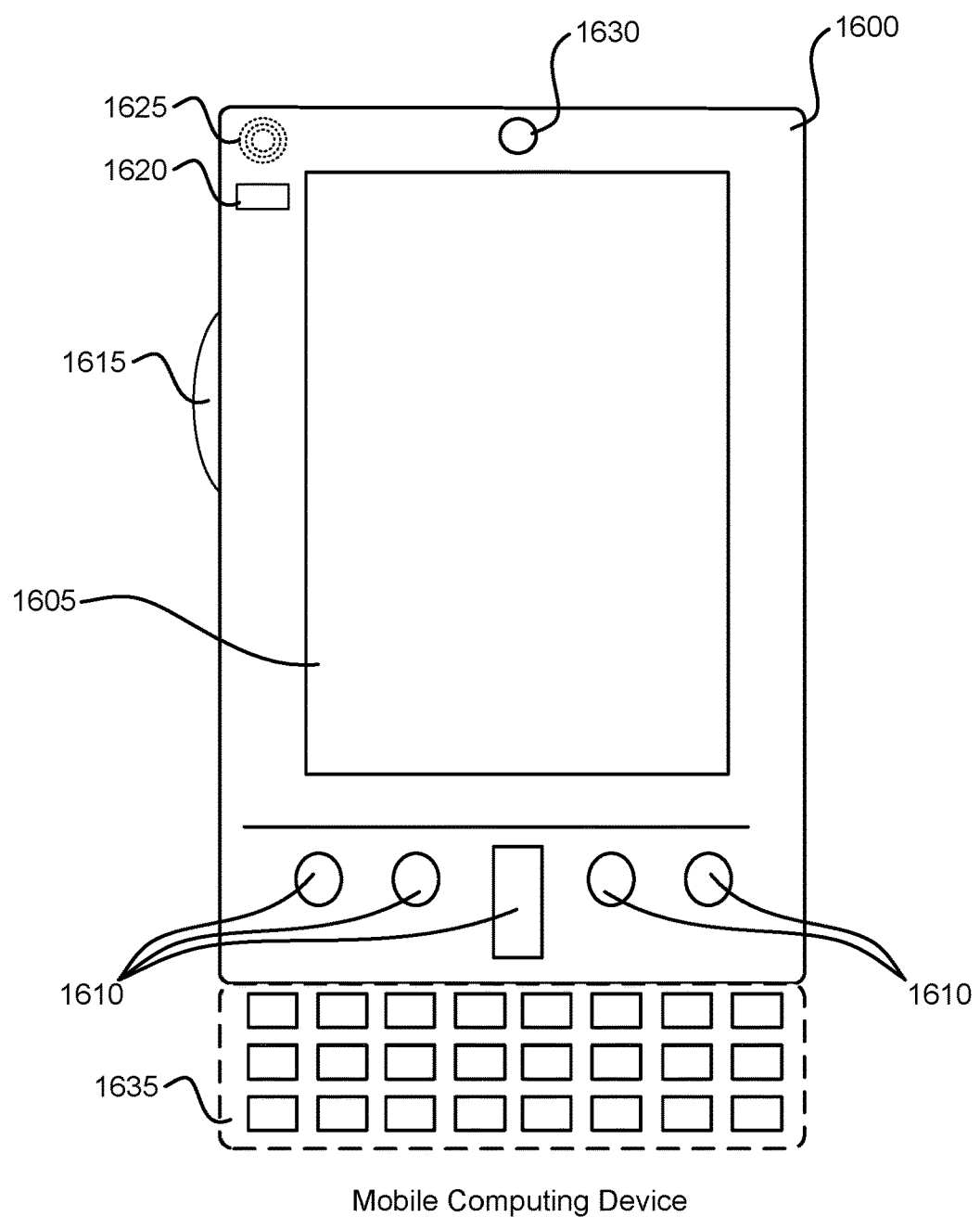
FIGS. 16A and 16B are simplified block diagrams of a mobile computing device with which embodiments of the present invention may be practiced.
Figure 16B:
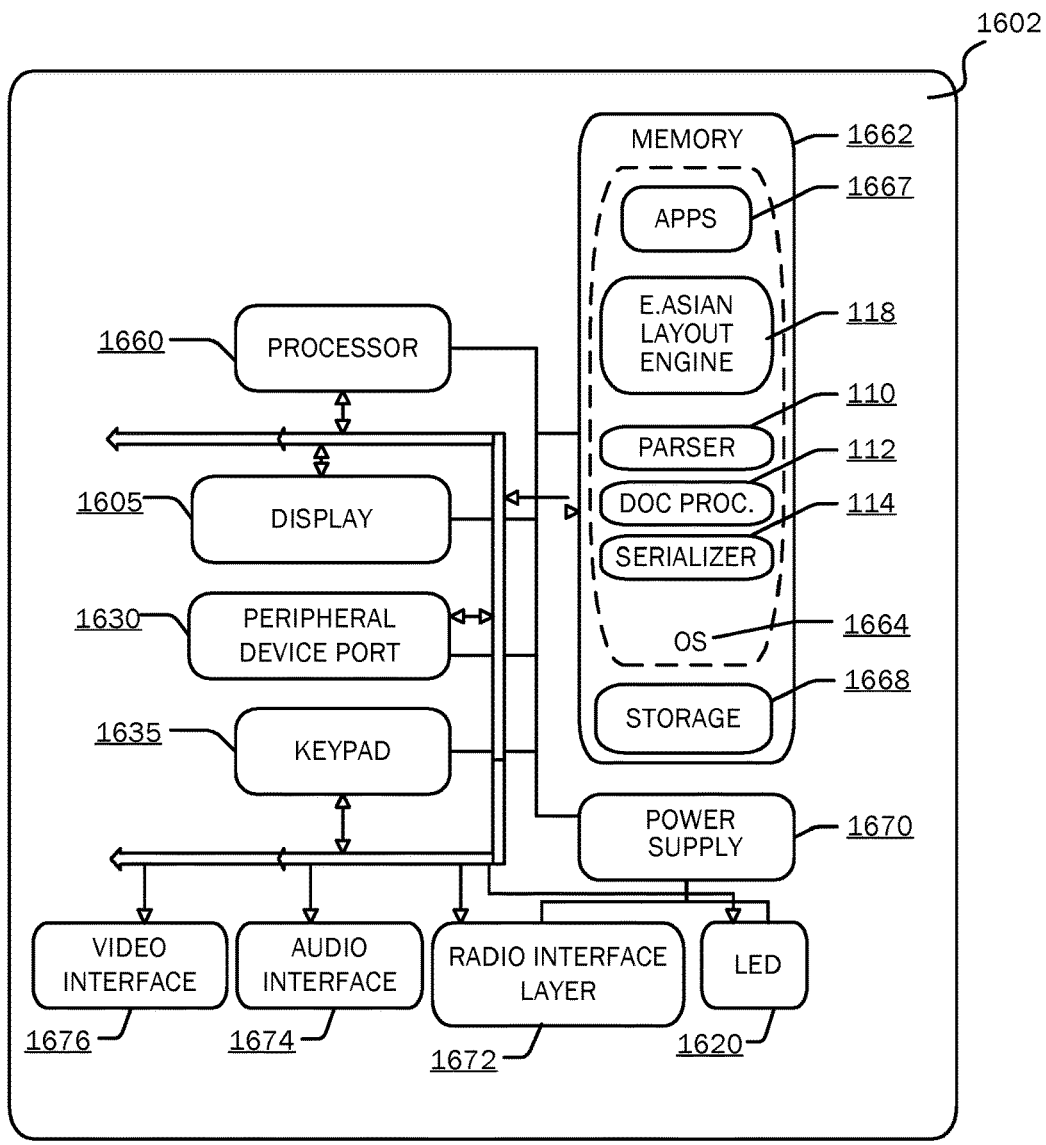
Figure 17:
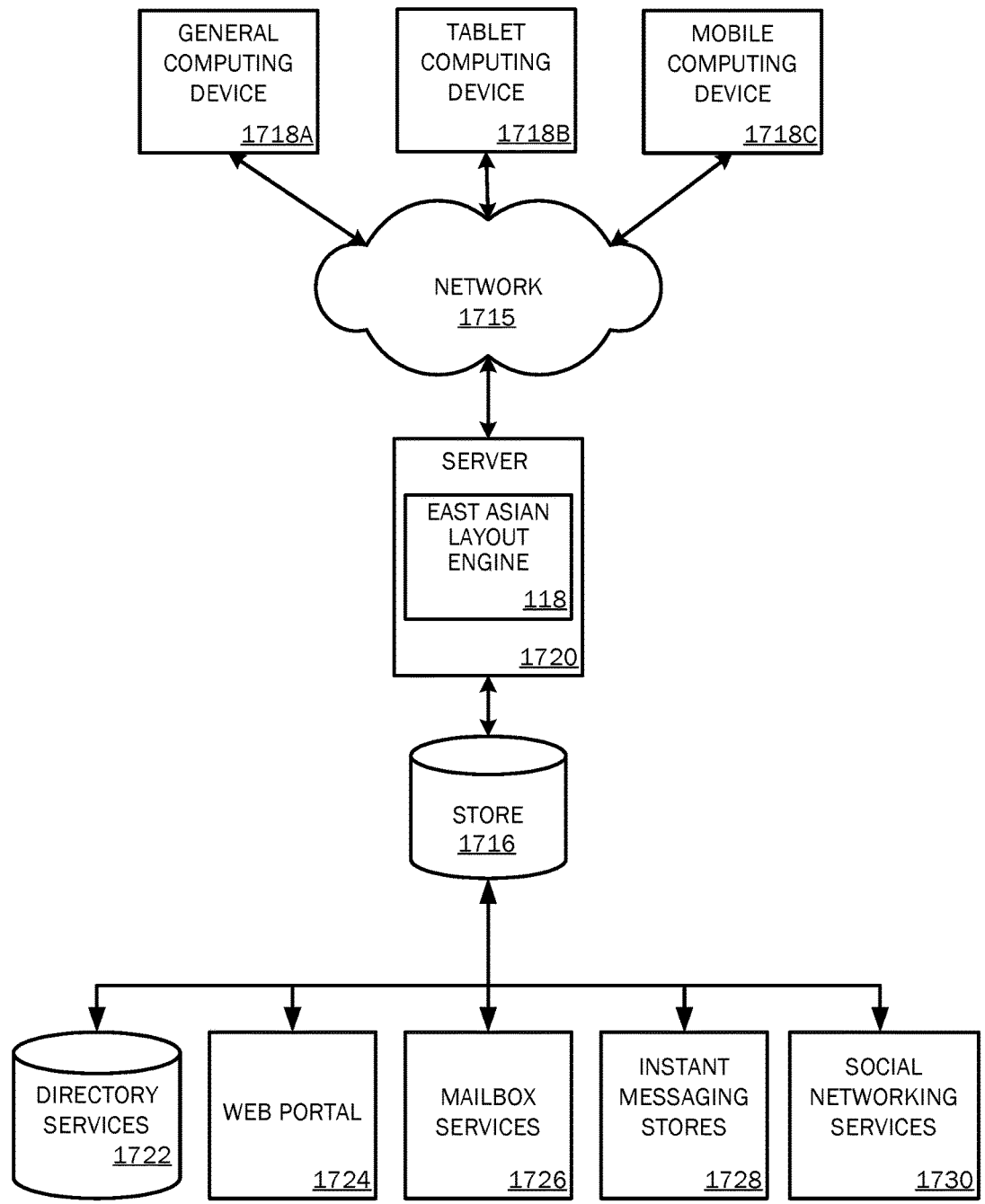
FIG. 17 is a simplified block diagram of a distributed computing system in which embodiments of the present invention may be practiced.

FIGS. 15-17 and the associated descriptions provide a discussion of a variety of operating environments in which embodiments of the invention may be practiced. However, the devices and systems illustrated and discussed with respect to FIGS. 15-17 are for purposes of example and illustration and are not limiting of a vast number of computing device configurations that may be utilized for practicing embodiments of the invention, described herein.

FIG. 15 is a block diagram illustrating physical components (i.e., hardware) of a computing device 1500 with which embodiments of the invention may be practiced. The computing device components described below may be suitable for the computing devices described above. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories. The system memory 1504 may include an operating system 1505 and one or more program modules 1506 suitable for running software applications 1520 such as the East Asian Layout Engine 118, the document processor 112, the parser 110, the document converter 102, and the serializer 114. The operating system 1505, for example, may be suitable for controlling the operation of the computing device 1500. Furthermore, embodiments of the invention may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., the East Asian Layout Engine 118, the parser 110, the document processor 112, and the serializer 114) may perform processes including, but not limited to, one or more of the stages of the methods 400, 700, 1000, and 1400 illustrated in FIGS. 4, 7A, 7B, 10, and 14. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the East Asian Layout Engine 118, the parser 110, the document processor 112, and the serializer 114 may be operated via application-specific logic integrated with other components of the computing device 1500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1500 may also have one or more input device(s) 1512 such as a keyboard, a mouse, a pen, a sound input device, a touch input device, etc. The output device(s) 1514 such as a display, speakers, a printer, etc. may also be included. The aforementioned devices are examples and others may be used. The computing device 1500 may include one or more communication connections 1516 allowing communications with other computing devices 1518. Examples of suitable communication connections 1516 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1504, the removable storage device 1509, and the non-removable storage device 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1500. Any such computer storage media may be part of the computing device 1500.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 16A and 16B illustrate a mobile computing device 1600, for example, a mobile telephone, a smart phone, a tablet personal computer, a laptop computer, and the like, with which embodiments of the invention may be practiced. With reference to FIG. 16A, one embodiment of a mobile computing device 1600 for implementing the embodiments is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display). If included, an optional side input element 1615 allows further user input. The side input element 1615 may be a rotary switch, a button, or any other type of manual input element. In alternative embodiments, mobile computing device 1600 may incorporate more or less input elements. For example, the display 1605 may not be a touch screen in some embodiments. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various embodiments, the output elements include the display 1605 for showing a graphical user interface (GUI), a visual indicator 1620 (e.g., a light emitting diode), and/or an audio transducer 1625 (e.g., a speaker). In some embodiments, the mobile computing device 1600 incorporates a vibration transducer for providing the user with tactile feedback. In yet another embodiment, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one embodiment of a mobile computing device. That is, the mobile computing device 1600 can incorporate a system (i.e., an architecture) 1602 to implement some embodiments.

In one embodiment, the system 1602 is implemented as a "smart phone" capable of running one or more applications (e.g., browser, e-mail, calendaring, contact managers, messaging clients, games, and media clients/players). In some embodiments, the system 1602 is integrated as a computing device, such as an integrated personal digital assistant (PDA) and wireless phone.

One or more application programs 1667 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1667 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600, including the East Asian Layout Engine 118, the parser 110, the document processor 112, and the serializer 114 described herein.

The system 1602 has a power supply 1670, which may be implemented as one or more batteries. The power supply 1670 might further include an external power source, such as an AC adapter or a powered docking cradle that supplements or recharges the batteries.

The system 1602 may also include a radio 1672 that performs the function of transmitting and receiving radio frequency communications. The radio 1672 facilitates wireless connectivity between the system 1602 and the "outside world," via a communications carrier or service provider. Transmissions to and from the radio 1672 are conducted under control of the operating system 1664. In other words, communications received by the radio 1672 may be disseminated to the application programs 1667 via the operating system 1664, and vice versa.

The radio 1672 allows the system 1602 to communicate with other computing devices, such as over a network. The radio 1672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1602 provides notifications using the visual indicator 1620 that can be used to provide visual notifications and/or an audio interface 1674 producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with embodiments of the present invention, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 6B by the non-volatile storage area 1668. Computer storage media may include volatile and nonvolatile, removable and non-removable media implemented in any method or technology for storage of information, such as computer readable instructions, data structures, program modules, or other data.

Data/information generated or captured by the mobile computing device 1600 and stored via the system 1602 may be stored locally on the mobile computing device 1600, as described above, or the data may be stored on any number of storage media that may be accessed by the device via the radio 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio 1672 or via a distributed computing network. Similarly, such data/information may be readily transferred between computing devices for storage and use according to well-known data/information transfer and storage means, including electronic mail and collaborative data/information sharing systems.

FIG. 17 illustrates one embodiment of the architecture of a system for providing vertical text detection 400, ruby text detection 700, horizontal-in-vertical text detection 1000, and East Asian language detection 1400 in a fixed format document 106 to one or more client devices, as described above. Content developed, interacted with, or edited in association with the East Asian Layout Engine 118, the parser 110, the document processor 112, and the serializer 114 may be stored in different communication channels or other storage types. For example, various documents may be stored using a directory service 1722, a web portal 1724, a mailbox service 1726, an instant messaging store 1728, or a social networking site 1730. The East Asian Layout Engine 118, the parser 110, the document processor 112, and the serializer 114 may use any of these types of systems or the like for enabling data utilization, as described herein. A server 1720 may provide the East Asian Layout Engine 118, the parser 110, the document processor 112, and the serializer 114 to clients. As one example, the server 1720 may be a web server providing the East Asian Layout Engine 118, the parser 110, the document processor 112, and the serializer 114 over the web. The server 1720 may provide the East Asian Layout Engine 118, the parser 110, the document processor 112, and the serializer 114 over the web to clients through a network 1715. By way of example, the client computing device 1718 may be implemented as the computing device 500 and embodied in a personal computer 1718a, a tablet computing device 1718b and/or a mobile computing device 1718c (e.g., a smart phone). Any of these embodiments of the client computing device 1718 may obtain content from the store 1716.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for detecting ruby text in a fixed format document, the method comprising:
   receiving, at a parser, a fixed format document containing one or more lines of text on one or more pages;
   detecting, by a line detection engine, one or more lines in the fixed format document containing one or more attributes of a ruby line;
   retaining the one or more lines in the fixed format document containing one or more attributes of a ruby line as ruby line candidates and a line successive to the one or more lines as ruby base line candidates;
   analyzing, by a document processor, the ruby line candidate for finding one or more ruby texts contained in the ruby line candidate;
   matching the one or more ruby texts with a corresponding ruby base text in a successive ruby base line candidate for reconstruction in a flow format document; and
   reconstructing, by a serializer, the fixed format document to a flow format document containing the matched one or more ruby texts and corresponding ruby base text.

2. The method of claim 1, wherein detecting one or more lines in the fixed format document containing one or more attributes of a ruby line comprises: analyzing the one or more lines of text for finding an empty line or a line consisting of whitespace characters; if a line of text is empty or consists of whitespace characters, discarding the line of text as a ruby line candidate or as a ruby base line candidate.

3. The method of claim 1, wherein detecting one or more lines in the fixed format document containing one or more attributes of a ruby line comprises: analyzing the one or more lines of text for determining if a line of text extends past a successive line of text more than a predetermined amount; if the line of text extends past the successive line of text more than the predetermined amount, discarding the line of text as a ruby line candidate.

4. The method of claim 1, wherein detecting one or more lines in the fixed format document containing one or more attributes of a ruby line comprises: analyzing the one or more lines of text for determining if a line of text comprises more empty space between successive words than a successive line of text; if the line of text comprises more empty space between successive words than the successive line of text, discarding the line of text as a ruby line candidate.

5. The method of claim 1, wherein detecting one or more lines in the fixed format document containing one or more attributes of a ruby line comprises: analyzing the one or more lines of text for determining if a font size of characters in a line of text is smaller than a font size of characters in a successive line of text; if the font size of the characters in the line of text is smaller than the font size of the characters in the successive line of text, retaining the line of text as a ruby line candidate and the successive line of text as a ruby base line candidate.

6. The method of claim 1, wherein detecting one or more lines in the fixed format document containing one or more attributes of a ruby line comprises: analyzing the one or more lines of text for determining if a distance between a line of text and a successive line of text is less than a predetermined distance; if the distance between the line of text and the successive line of text is less than the predetermined distance, retaining the line of text as a ruby line candidate and the successive line of text as a ruby base line candidate.

7. The method of claim 1, wherein detecting one or more lines in the fixed format document containing one or more attributes of a ruby line comprises:
   analyzing the ruby base line candidates for determining if the ruby base line candidate comprises Chinese, Japanese, or Korean characters; and
   if the ruby base line candidate comprises Chinese, Japanese, or Korean characters, retaining the line of text as a ruby base line candidate as a preceding line of text as a ruby line candidate.

8. The method of claim 1, wherein matching the one or more ruby texts with a corresponding ruby base text in a successive ruby base line candidate comprises assigning characters below the ruby text in the ruby base line with the ruby text.

9. The method of claim 1, wherein matching the one or more ruby texts with a corresponding ruby base text in a successive ruby base line candidate comprises assigning characters left of the ruby text in the ruby base line with the ruby text.

10. The method of claim 1, further comprising restructuring the ruby line candidate and the ruby base line candidate as a flow format ruby line and a flow format ruby base line in a flow format document, the ruby line comprising one or more ruby texts and the ruby base line comprising one or more ruby base texts.

11. A computing device for detecting ruby text in a fixed format document, comprising:
a processing unit; and
a memory including computer-readable instructions which when executed by the processor are operable to:
detect, at a parser, a fixed format document;
detect, at a line detection engine, one or more lines in the fixed format document containing one or more attributes of a ruby line;
retain the one or more lines in the fixed format document containing one or more attributes of a ruby line as ruby line candidates and a line successive to the one or more lines as ruby base line candidates;
analyze, by a document processor, the ruby line candidate for finding one or more ruby texts contained in the ruby line candidate;
match the one or more ruby texts with a corresponding ruby base text in a successive ruby base line candidate for reconstruction in a flow format document; and
reconstruct, by a serializer, the fixed format document as the flow format document containing the matched one or more ruby texts and the corresponding ruby base text.

12. The computing device of claim 11, wherein detecting one or more lines in the fixed format document containing one or more attributes of a ruby line comprises: analyzing the one or more lines of text for finding an empty line or a line consisting of whitespace characters; if a line of text is empty or consists of whitespace characters, discarding the line of text as a ruby line candidate or as a ruby base line candidate.

13. The computing device of claim 11, wherein detecting one or more lines in the fixed format document containing one or more attributes of a ruby line comprises: analyzing the one or more lines of text for determining if a line of text extends past a successive line of text more than a predetermined amount; if the line of text extends past the successive line of text more than the predetermined amount, discarding the line of text as a ruby line candidate.

14. The computing device of claim 11, wherein detecting one or more lines in the fixed format document containing one or more attributes of a ruby line comprises: analyzing the one or more lines of text for determining if a line of text comprises more empty space between successive words than a successive line of text; if the line of text comprises more empty space between successive words than the successive line of text, discarding the line of text as a ruby line candidate.

15. The computing device of claim 11, wherein detecting one or more lines in the fixed format document containing one or more attributes of a ruby line comprises: analyzing the one or more lines of text for determining if a font size of characters in a line of text is smaller than a font size of characters in a successive line of text; if the font size of the characters in the line of text is smaller than the font size of the characters in the successive line of text, retaining the line of text as a ruby line candidate and the successive line of text as a ruby base line candidate.

16. The computing device of claim 11, wherein detecting one or more lines in the fixed format document containing one or more attributes of a ruby line comprises: analyzing the one or more lines of text for determining if a distance between a line of text and a successive line of text is less than a predetermined distance; if the distance between the line of text and the successive line of text is less than the predetermined distance, retaining the line of text as a ruby line candidate and the successive line of text as a ruby base line candidate.

17. The computing device of claim 11, wherein detecting one or more lines in the fixed format document containing one or more attributes of a ruby line comprises:
analyzing the ruby base line candidates for determining if the ruby base line candidate comprises Chinese, Japanese, or Korean characters; and
if the ruby base line candidate comprises Chinese, Japanese, or Korean characters, retaining the line of text as a ruby base line candidate as a preceding line of text as a ruby line candidate.

18. The computing device of claim 11, wherein matching the one or more ruby texts with a corresponding ruby base text in a successive ruby base line candidate comprises assigning characters below the ruby text in the ruby base line with the ruby text.

19. The computing device of claim 11, wherein matching the one or more ruby texts with a corresponding ruby base text in a successive ruby base line candidate comprises assigning characters left of the ruby text in the ruby base line with the ruby text.

20. A computer readable storage device including instructions, which when executed by a processor, detect ruby text in a fixed format document by:
detecting, at a parser, a fixed format document;
detecting, at a line detection engine, one or more lines in the fixed format document containing one or more attributes of a ruby line including:
analyzing the one or more lines of text for finding an empty line or a line consisting of whitespace characters;
if a line of text is empty or consists of whitespace characters, discarding the line of text as a ruby line candidate or as a ruby base line candidate;
analyzing the one or more lines of text for determining if a line of text extends past a successive line of text more than a predetermined amount;
if the line of text extends past the successive line of text more than the predetermined amount, discarding the line of text as a ruby line candidate;
analyzing the one or more lines of text for determining if a line of text comprises more empty space between successive words than a successive line of text;
if the line of text comprises more empty space between successive words than the successive line of text, discarding the line of text as a ruby line candidate;
analyzing the one or more lines of text for determining if a font size of characters in a line of text is smaller than a font size of characters in a successive line of text;
if the font size of the characters in the line of text is smaller than the font size of the characters in the successive line of text, retaining the line of text as a ruby line candidate and the successive line of text as a ruby base line candidate;
analyzing the one or more lines of text for determining if a distance between a line of text and a successive line of text is less than a predetermined distance;
if the distance between the line of text and the successive line of text is less than the predetermined distance, retaining the line of text as a ruby line candidate and the successive line of text as a ruby base line candidate;

analyzing the ruby base line candidates for determining if the ruby base line candidate comprises Chinese, Japanese, or Korean characters; and if the ruby base line candidate comprises Chinese, Japanese, or Korean characters, retaining the line of text as a ruby base line candidate as a preceding line of text as a ruby line candidate;

retaining the one or more lines in the fixed format document containing one or more attributes of a ruby line as ruby line candidates and a line successive to the one or more lines as ruby base line candidates;

analyzing, by a document processor, the ruby line candidate for finding one or more ruby texts contained in the ruby line candidate;

matching the one or more ruby texts with a corresponding ruby base text in a successive ruby base line candidate for reconstruction in a flow format document; and reconstructing, by a serializer, the fixed format document as the flow format document containing the matched one or more ruby texts and the corresponding ruby base text.

\* \* \* \* \*